US012581411B2

(12) United States Patent (10) Patent No.: US 12,581,411 B2
Yang et al. (45) Date of Patent: Mar. 17, 2026

(54) SLEEP SCHEDULING METHOD AND DEVICE

(71) Applicant: Huawei Technologies Co., Ltd., Shenzhen (CN)

(72) Inventors: Ming Yang, Shanghai (CN); Zhiguang He, Shenzhen (CN); Jianhua Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 18/288,665

(22) PCT Filed: Apr. 8, 2022

(86) PCT No.: PCT/CN2022/085845
§ 371 (c)(1),
(2) Date: Oct. 27, 2023

(87) PCT Pub. No.: WO2022/228085
PCT Pub. Date: Nov. 3, 2022

(65) Prior Publication Data
US 2024/0205823 A1 Jun. 20, 2024

(30) Foreign Application Priority Data

Apr. 30, 2021 (CN) .......................... 202110480045.3

(51) Int. Cl.
*H04W 76/28* (2018.01)
*H04W 52/02* (2009.01)
(52) U.S. Cl.
CPC ... *H04W 52/0219* (2013.01); *H04W 52/0216* (2013.01)
(58) Field of Classification Search
CPC ......... H04W 52/0216; H04W 52/0219; H04W 52/0229; H04W 76/28
See application file for complete search history.

(56) References Cited

U.S. PATENT DOCUMENTS

2015/0169033 A1* 6/2015 Shukla .................. G06F 1/3234
713/320
2021/0036915 A1 2/2021 Svensson et al.

FOREIGN PATENT DOCUMENTS

CN 105744608 A 7/2016
CN 108093468 A 5/2018

OTHER PUBLICATIONS

Draft Standard for Information Technology—Telecommunications and information exchange between systems—Local and metropolitan area networks-Specific requirements. Part 11: Wireless LAN Medium Access Control (MAC) and Physical Layer (PHY) specifications. Amendment 4: Enhancements for Very High Throughput for Operation in Bands below 6 GHz. IEEE P802.11ac/D7.0, Sep. 2013, total 456 pages.

* cited by examiner

*Primary Examiner* — Sam Bhattacharya
(74) *Attorney, Agent, or Firm* — Slater Matsil, LLP

(57) ABSTRACT

This application discloses a sleep scheduling method and a device. The method may be applied to a distributed system including a first device, a second device, and a third device. The method includes: The first device determines, based on first scenario information, that a first service arrives, generates second sleep and wake-up information based on the first scenario information and first sleep and wake-up information, and updates the second sleep and wake-up information to a sleep and wake-up scheduling table, where the first sleep and wake-up information indicates a current sleep and wake-up status of the first device in each time slice in a sleep scheduling period, and the second sleep and wake-up information indicates a sleep and wake-up status that needs to be met in each time slice in the sleep scheduling period when the first device performs a service including the first service.

20 Claims, 13 Drawing Sheets

| MAC header field | Code field | OUI field | OUI type field | Action type field | One or more attribute fields | FCS field |
|---|---|---|---|---|---|---|

| MAC header field | Code field | OUI field | OUI type field | Action type field | Attribute field | FCS field |
|---|---|---|---|---|---|---|
| | | | | | | |

SLEEP SCHEDULING METHOD AND DEVICE

CROSS REFERENCE TO RELATED APPLICATIONS

This application is a National Stage of International Application No. PCT/CN2022/085845, filed on Apr. 8, 2022, which claims priority to Chinese Patent Application No. 202110480045.3, filed on Apr. 30, 2021, both of which are hereby incorporated by reference in their entireties.

TECHNICAL FIELD

This application relates to the field of communication technologies, and in particular, to a sleep scheduling method and a device.

BACKGROUND

In a network topology of multi-device interconnection, because there are a large quantity of links of devices, the devices each have higher load and higher power consumption than those in a common single-connection scenario. To reduce power consumption of each device in the network topology, a sleep scheduling manner is proposed, for example, a current sleep scheduling manner based on a power save mode (power save mode, PSM) protocol, a sleep scheduling manner based on a target wake time (target wake time, TWT) protocol, or a sleep scheduling manner based on a notice of absence (notice of absence, NOA) protocol.

The foregoing three sleep scheduling manners each may be considered as a scheduling manner based on a central node, and cannot be applied to a many-to-many network topology.

SUMMARY

This application provides a sleep scheduling method and a device, to reduce power consumption of each device as much as possible without affecting normal service interaction of each device in a distributed system.

According to a first aspect, a sleep scheduling method is provided. The method is applied to a distributed system including a first device, a second device, and a third device. The distributed system may be a one-to-many connection system, or may be a many-to-many connection system. The method is applied to any device in the distributed system. An example in which the method is performed by the first device is used below. The method includes:

The first device determines, based on first scenario information, that a first service arrives, generates second sleep and wake-up information based on the first scenario information and first sleep and wake-up information, and updates the second sleep and wake-up information to a sleep and wake-up scheduling table, where the first scenario information indicates a service feature of the first service; the first sleep and wake-up information indicates a current sleep and wake-up status of the first device in each time slice in a sleep scheduling period; the second sleep and wake-up information indicates a sleep and wake-up status that needs to be met in each time slice in the sleep scheduling period when the first device performs a service including the first service; and the sleep and wake-up scheduling table includes a sleep and wake-up status of each device in the distributed system, and is used by the first device to perform data receiving and sending with another device in the distributed system.

In this embodiment of this application, to reduce power consumption of each device in the distributed system, minimum sleep and wake-up time (also referred to as a time slice) is defined in a time dimension, and N time slices are used as one sleep scheduling period. The unified sleep and wake-up scheduling table is established for each device in the distributed system. The sleep and wake-up scheduling table may indicate latest sleep and wake-up time of all devices in the distributed system in each time slice in the sleep scheduling period. Therefore, each device can select, based on the sleep and wake-up scheduling table, another appropriate device to perform a distributed service cooperatively. For example, a service (for example, the first service) may need to be transmitted between the first device and another device (for example, the second device) in the distributed system. The first device may update a sleep and wake-up status of the first device in a sleep and wake-up period based on the feature of the first service, to ensure normal running of the first service and reduce power consumption as much as possible. Further, the first device may update an updated sleep and wake-up information to the sleep and wake-up scheduling table. Other devices are similar to the first device. In this way, each device in the distributed system can independently schedule each device based on a specific service, so that each device enters sleep as many as possible without affecting a service delay throughput, thereby reducing power consumption. Each device dynamically updates a sleep and wake-up status of the device based on a sleep and wake-up status of another device, and the sleep and wake-up status can change flexibly. This further meets an actual transmission requirement of a burst service. In addition, because each device in the distributed system does not need to rely on a fixed device in the distributed system, for example, a central node, to update the sleep and wake-up scheduling table, the sleep scheduling method provided in this embodiment of this application can be applied to a many-to-many connection scenario.

In a possible implementation, the method further includes:

The first device broadcasts a first periodical notify frame (periodical notify frame, PNF) in a preset time slice in the sleep scheduling period, receives a second PNF from the second device, and updates the stored sleep and wake-up scheduling table based on the second PNF, where the first PNF indicates the second sleep and wake-up information, and the second PNF indicates sleep and wake-up information of the second device. It may be understood that each device may broadcast current sleep and wake-up information of the device in a preset time slice in the sleep scheduling period, so that the device maintains the sleep and wake-up scheduling table based on sleep and wake-up information of another device. This ensures that sleep and wake-up time of all the devices in the distributed system in each time slice in the sleep scheduling period is the latest, and as many devices as possible enter sleep mode when services are performed between devices, thereby reducing power consumption.

In a possible implementation, the method further includes:

The first device determines to enter any one of the following scenarios, the first device updates sleep and wake-up information corresponding to a link, and notifies the second device of updated sleep and wake-up information corresponding to the link, where the scenarios include a keepalive scenario, a link change scenario, an emergency service scenario, or a service change scenario, and the keepalive scenario indicates that a link of the first device keeps in a connected state and there is no service data interaction between the first device and another device. It should be understood that, as the service of the first device is performed, an application scenario of the first device may change. For example, there is an emergency service between the first device and the second device. For another example, traffic on a transmission link between the first device and the second device changes greatly. In this case, the first device can adaptively adjust the sleep and wake-up information corresponding to the link, and notify the second device of the information. In this way, the second device can update stored sleep and wake-up information corresponding to the link based on the latest sleep and wake-up information corresponding to the transmission link between the first device and the second device, without affecting service running on a transmission link of another device.

In a possible implementation, the first device enters the keepalive scenario, and the method further includes:

The first device queries a cached data volume; when the data volume is greater than or equal to a first preset threshold, the first device updates sleep and wake-up information corresponding to a transmission link between the first device and the second device to first-link sleep and wake-up information; and the first device sends a first notification frame to the second device, and receives a second notification frame from the second device, where the first notification frame carries the first-link sleep and wake-up information, so that the second device updates, based on the first-link sleep and wake-up information, stored sleep and wake-up information corresponding to the transmission link between the first device and the second device to second-link sleep and wake-up information, and the second notification frame carries the second-link sleep and wake-up information. In this solution, a possible application scenario is considered. For example, the first device may not send service data in time due to factors such as interference. In this scenario, although there may be no service transmission between the first device and the second device, to send, as much as possible, data cached by the first device, the first device may still update the sleep and wake-up information of the first device. For example, the first device may set first P slots in the sleep and wake-up period to a wake-up state, to reduce cache space of the first device as much as possible. To ensure that the first device and a peer device have consistent sleep and wake-up information corresponding to the transmission link for sending the cached data, the first device notifies the second device of the first-link sleep and wake-up information. Likewise, the second device updates the sleep and wake-up information of the corresponding transmission link, and can notify the first device of the second-link sleep and wake-up information.

In a possible implementation, the first device enters the link change scenario, and the method further includes:

The first device determines that traffic on a transmission link between the first device and the second device is greater than or equal to a second preset threshold, and updates sleep and wake-up information corresponding to the transmission link between the first device and the second device to first-link sleep and wake-up information; and the first device sends a first notification frame to the second device, and receives a second notification frame from the second device, where the first notification frame carries the first-link sleep and wake-up information, so that the second device updates, based on the first-link sleep and wake-up information, stored sleep and wake-up information corresponding to the transmission link between the first device and the second device to second-link sleep and wake-up information, and the second notification frame carries the second-link sleep and wake-up information. In this solution, another possible application scenario is considered. For example, with a change in the traffic on the link between the first device and the second device, the current sleep and wake-up status of the first device may not be optimal. In this case, the first device can adaptively and temporarily increase a wake-up time slice based on a link traffic volume, to transmit the service data stored in a data cache module to a peer device quickly, thereby reducing a delay.

In a possible implementation, the first device enters the emergency service scenario, and the method further includes:

The first device updates sleep and wake-up information corresponding to a transmission link between the first device and the second device to first-link sleep and wake-up information; and the first device sends a first notification frame to the second device, and receives a second notification frame from the second device, where the first notification frame carries the first-link sleep and wake-up information, so that the second device updates, based on the first-link sleep and wake-up information, stored sleep and wake-up information corresponding to the transmission link between the first device and the second device to second-link sleep and wake-up information, and the second notification frame carries the second-link sleep and wake-up information. In this solution, still another possible application scenario is considered. That is, a burst service is generated between a plurality of interconnected devices. In this case, each device in the distributed system can be flexibly scheduled. For example, the first device and the second device negotiate a sleep and wake-up time slice for receiving and sending emergency services, so that data of the burst service is transmitted as quickly as possible, without affecting overall sleep of the distributed system as much as possible.

In a possible implementation, that the first device generates second sleep and wake-up information based on the first scenario information and first sleep and wake-up information includes: The first device generates the second sleep and wake-up information according to a first preset rule, the first scenario information, and the first sleep and wake-up information, where the first preset rule meets one or more of the following preset rules.

For example, a preset rule 1 is as follows: The first device currently has no service, the first device cannot determine sleep and wake-up information for performing the first service, and the second sleep and wake-up information indicates that the first device is in a wake-up state in each time slice in the sleep scheduling period. It may be understood that, when the first device currently has no service and has the first service, the first device cannot determine a sleep and wake-up status of the first service. In this case, to ensure normal running of the first service subsequently, the first device may be set to be in the wake-up state in the entire sleep scheduling period.

For example, a preset rule 2 is as follows: The first device currently has a service, the first sleep and wake-up information indicates that the first device is in a wake-up state in each time slice in the sleep scheduling period, and the second sleep and wake-up information indicates that the first device is in a wake-up state in each time slice in the sleep scheduling period. It may be understood that the first device currently has the service, and the current service requires that the first device is in the wake-up state in the entire sleep scheduling period. Therefore, to ensure smooth running of the current service, regardless of a sleep and wake-up state that the first service needs to meet, the first device needs to be in the wake-up state in the entire sleep scheduling period.

For example, a preset rule 3 is as follows: The first device currently has a service, the first sleep and wake-up information indicates that the first device is in a wake-up state in some time slices in the sleep scheduling period, and if the first device cannot determine sleep and wake-up information for performing the first service, the second sleep and wake-up information indicates that the first device is in a wake-up state in each time slice in the sleep scheduling period; or if the first device can determine sleep and wake-up information for performing the first service, the second sleep and wake-up information is generated based on the first sleep and wake-up information and the sleep and wake-up information for performing the first service by the first device. It may be understood that the first device currently has the service, but the current service requires that the first device is in the wake-up state only in some time slices in the entire sleep scheduling period. In this case, if the first device cannot determine a sleep and wake-up status of the arrived first service, to ensure normal running of the first service subsequently, the first device may be set to be in the wake-up state in the entire sleep scheduling period; or if the first device can determine a sleep and wake-up status of the first service, the first device can determine, with reference to a sleep and wake-up status that needs to be met by the current service and a sleep and wake-up status that needs to be met by the first service, a sleep and wake-up status that needs to be met by the first device and the current service, so as to ensure that the first device enters sleep as much as possible, thereby reducing power consumption.

In a possible implementation, the first scenario information includes one or more of the following information:

type information of the first service, a minimum delay tolerance value of the first service, a packet transmission interval corresponding to the first service, and a scenario level corresponding to the first service, where the scenario level indicates a sleep and wake-up status of the first service in each time slice in the sleep scheduling period, and different scenario levels correspond to different sleep and wake-up statuses.

A specific form of the scenario information is not limited in this embodiment of this application. For example, the scenario information may be the minimum delay tolerance value of the first service, and the first device determines, based on the minimum delay tolerance value of the first service, sleep and wake-up information that needs to be met. This is direct. For another example, the scenario information may be the type information of the service. In this case, the first device can determine the service feature of the first service based on related information delivered by an application layer based on a service flow, determine, based on the service feature, a minimum delay tolerance value that needs to be met by the first service, and then determine a sleep and wake-up status that needs to be met. Alternatively, the scenario information may be the packet transmission interval of the first service. Because an application layer may not deliver related information of the first service, in this case, the first device can listen to some features of the first service by the first device, for example, the packet transmission interval of the first service, to determine a sleep and wake-up status that needs to be met. Alternatively, the scenario information may be the scenario level, and directly represents a sleep scheduling status that needs to be met by the first service. This is more direct.

According to a second aspect, an electronic device is provided. The electronic device includes a display, one or more processing modules, a memory, and one or more programs. The one or more programs are stored in the memory, the one or more programs include instructions, and when the instructions are executed by the electronic device, the electronic device is enabled to perform the method performed by the first device provided in any one of the first aspect or the possible implementations, or the electronic device is enabled to perform the method performed by the second device provided in any one of the first aspect or the possible implementations.

For example, the electronic device may perform the following operations:

determining, based on first scenario information, that a first service arrives, generating second sleep and wake-up information based on the first scenario information and first sleep and wake-up information, and updating the second sleep and wake-up information to a sleep and wake-up scheduling table, where the first scenario information indicates a service feature of the first service; the first sleep and wake-up information indicates a current sleep and wake-up status of the first device in each time slice in a sleep scheduling period; the second sleep and wake-up information indicates a sleep and wake-up status that needs to be met in each time slice in the sleep scheduling period when the first device performs a service including the first service; and the sleep and wake-up scheduling table includes a sleep and wake-up status of each device in the distributed system, and is used by the first device to perform data receiving and sending with another device in the distributed system.

In an optional implementation, the electronic device further includes a transceiver module; and the transceiver module is configured to: broadcast a first PNF in a preset time slice in the sleep scheduling period, and receive a second PNF from the second electronic device, where the first PNF indicates the second sleep and wake-up and the second PNF indicates sleep and wake-up information of a second electronic device.

In an optional implementation, the processing module is further configured to:

determine to enter any one of the following scenarios, update sleep and wake-up information corresponding to a link, and notify the second device of updated sleep and wake-up information corresponding to the link, where the scenarios include a keepalive scenario, a link change scenario, an emergency service scenario, or a service change scenario, and the keepalive scenario indicates that a link of the first device keeps in a connected state and there is no service data interaction between the first device and another device.

In an optional implementation, the electronic device enters the keepalive scenario, and the processing module is further configured to: query a cached data volume; and when the data volume is greater than or equal to a first preset threshold, update sleep and wake-up information corresponding to a transmission link between the electronic device and the second device to first-link sleep and wake-up information; and the transceiver module is further configured to: send a first notification frame to the second device, where the first notification frame carries the first-link sleep and wake-up information, so that the second device updates, based on the first-link sleep and wake-up information, stored sleep and wake-up information corresponding to the transmission link between the electronic device and the second device to second-link sleep and wake-up information; and receive a second notification frame from the second device, where the second notification frame carries the second-link sleep and wake-up information.

In an optional implementation, the electronic device enters the link change scenario, and the processing module is further configured to: determine that traffic on a transmission link between the electronic device and the second device is greater than or equal to a second preset threshold, and update sleep and wake-up information corresponding to the transmission link between the electronic device and the second device to first-link sleep and wake-up information; and the transceiver module is further configured to: send a first notification frame to the second device, where the first notification frame carries the first-link sleep and wake-up information, so that the second device updates, based on the first-link sleep and wake-up information, stored sleep and wake-up information corresponding to the transmission link between the electronic device and the second device to second-link sleep and wake-up information; and receive a second notification frame from the second device, where the second notification frame carries the second-link sleep and wake-up information.

In an optional implementation, the electronic device enters the emergency service scenario, and the processing module is further configured to update sleep and wake-up information corresponding to a transmission link between the electronic device and the second device to first-link sleep and wake-up information; and the transceiver module is further configured to: send a first notification frame to the second device, where the first notification frame carries the first-link sleep and wake-up information, so that the second device updates, based on the first-link sleep and wake-up information, stored sleep and wake-up information corresponding to the transmission link between the electronic device and the second device to second-link sleep and wake-up information; and receive a second notification frame from the second device, where the second notification frame carries the second-link sleep and wake-up information.

In an optional implementation, the processing module is specifically configured to: generate the second sleep and wake-up information according to a first preset rule, the first scenario information, and the first sleep and wake-up information, where the first preset rule meets one or more of the following:

the electronic device currently has no service, the electronic device cannot determine sleep and wake-up information for performing the first service, and the second sleep and wake-up information indicates that the electronic device is in a wake-up state in each time slice in the sleep scheduling period;

the electronic device currently has a service, the first sleep and wake-up information indicates that the electronic device is in a wake-up state in each time slice in the sleep scheduling period, and the second sleep and wake-up information indicates that the electronic device is in a wake-up state in each time slice in the sleep scheduling period; or the electronic device currently has a service, the first sleep and wake-up information indicates that the electronic device is in a wake-up state in some time slices in the sleep scheduling period, and if the electronic device cannot determine sleep and wake-up information for performing the first service, the second sleep and wake-up information indicates that the electronic device is in a wake-up state in each time slice in the sleep scheduling period; or if the electronic device can determine sleep and wake-up information for performing the first service, the second sleep and wake-up information is generated based on the first sleep and wake-up information and the sleep and wake-up information for performing the first service by the electronic device.

In an optional implementation, the first scenario information includes one or more of the following information:

type information of the first service, a minimum delay tolerance value of the first service, a packet transmission interval corresponding to the first service, and a scenario level corresponding to the first service, where the scenario level indicates a sleep and wake-up status of the first service in each time slice in the sleep scheduling period, and different scenario levels correspond to different sleep and wake-up statuses.

For technical effect brought by the second aspect or the optional implementations, refer to descriptions of the technical effect brought by the first aspect or the corresponding implementations.

According to a third aspect, an electronic device is provided. The electronic device includes modules/units configured to perform the method performed by the first device in any one of the first aspect or the possible implementations.

According to a fourth aspect, a system is provided. The system includes a first device, a second device, and a third device. Optionally, the system may further include another device, and the device included in the system can implement a distributed service, for example, multi-screen collaboration. Each device may be implemented by using the electronic device in the second aspect or the electronic device in the third aspect.

According to a fifth aspect, a chip is provided. The chip includes a processor and an interface, the interface is configured to communicate with the processor and receive information from another device, and the processor is configured to perform the method in any one of the first aspect or the possible implementations of the first aspect.

According to a sixth aspect, a computer-readable storage medium is provided. The computer-readable storage medium is configured to store a computer program, and when the computer program is run on a computer, the computer is enabled to perform one or more of the following methods: the method performed by the first device in any one of the first aspect or the possible implementations.

According to a seventh aspect, a computer program product including instructions is provided. The computer program product is configured to store a computer program, and when the computer program is run on a computer, the computer is enabled to perform one or more of the following methods: the method performed by the first device in any one of the first aspect or the possible implementations.

According to the technical solutions provided in embodiments of this application, the unified sleep and wake-up scheduling table is established for each device in the distributed system. This can reduce, when each device implements service receiving and sending with another device based on the sleep and wake-up scheduling table, power consumption of each device as much as possible without affecting normal service interaction of each device in the distributed system. In addition, because each device in the distributed system does not need to rely on a fixed device in the distributed system, for example, a central node, to update the sleep and wake-up scheduling table, the sleep scheduling method provided in embodiments of this application can be applied to the many-to-many connection scenario.

DETAILED DESCRIPTION OF ILLUSTRATIVE EMBODIMENTS

Figure 1:
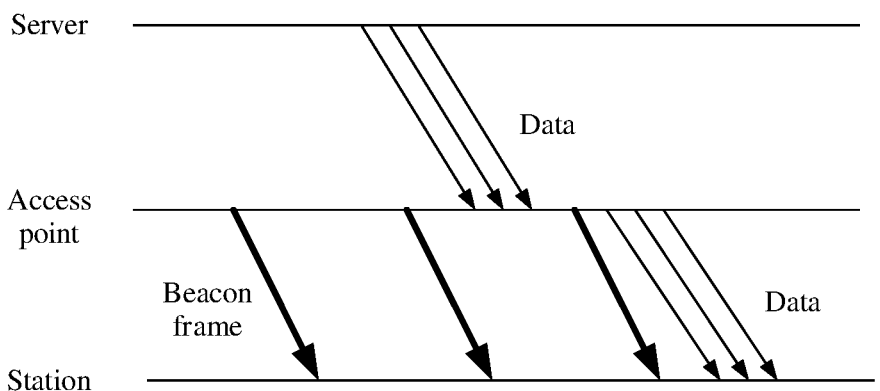
FIG. 1 is a schematic diagram of operation of a PSM.

To make the objectives, technical solutions, and advantages of this application clearer, the following further describes this application in detail with reference to the accompanying drawings.

With development of internet of things technologies, more services or applications are expected to be implemented through multi-device collaboration. For example, to improve user experience, a multi-screen collaboration function (or referred to as a multi-device collaboration function) is provided, so as to support an application and a service of multi-device collaboration, for example, multi-screen collaboration and information sharing. For example, in the multi-screen collaboration function, a device 1 may perform projection to a device 2, so that a file on the device 1 can be opened on the device 2. For example, if a mobile phone and a personal computer (personal computer, PC) perform multi-screen collaboration, a mirror of the mobile phone is displayed on a display of the PC, and the mirror of the mobile phone displayed on the PC may also be understood as a projection screen. A user performs an operation on the projection screen of the PC. For example, if the user chooses to open a file A, the PC can open the file A, but the file A is actually a file on the mobile phone. Compared with the mobile phone, the PC has a larger display area. The user can view the file on the PC, and this can improve user's view effect.

For ease of description, in embodiments of this application, an application or a service that depends on multi-device collaboration is collectively referred to as a distributed service. It should be understood that, to support the distributed service, a plurality of terminal devices such as a mobile phone, a tablet, a PC, and a display need to be connected together, so as to implement a one-to-one connection, a one-to-many connection, or even a many-to-many connection between the plurality of devices, namely, multi-device interconnection, so that the distributed service runs cooperatively in the plurality of terminal devices.

It should be understood that, in a network topology of multi-device interconnection, because there are a large quantity of links of devices, the devices each have higher load and higher power consumption than those in a common single-connection scenario. Therefore, in some embodiments, a plurality of sleep scheduling manners are provided, for example, the following sleep scheduling manner, to reduce power consumption of each device in the network topology.

A sleep scheduling manner 1 is a sleep scheduling manner based on a power save mode (power save mode, PSM) protocol. The sleep scheduling manner is used in a one-to-many network topology architecture. For example, in the network topology, one-to-many is a one-to-many relationship between an access point (also referred to as an access node (access point, AP)) and workstations (also referred to as stations) (stations, STAs). The AP may be considered as a primary node, and the STAs each may be considered as a secondary node. The AP is used as a central node to maintain connections between the plurality of STA devices. Therefore, the sleep scheduling method based on the PSM protocol may also be considered as a centralized sleep policy. A main idea is as follows: The AP caches data of the STAs. When ending sleep, any STA actively requests data from the AP, and then the AP sends the data to the STA. When the AP does not cache data of a STA, the STA may continue to sleep, to reduce power consumption.

For ease of understanding, FIG. 1 is a schematic diagram of operation of a PSM. A server may send data of one or more STAs to the AP, and the AP caches the data of the one or more devices. The AP periodically broadcasts a cache status of the AP in a beacon (beacon) frame. Any STA may periodically wake up at a fixed start moment of the beacon frame based on a listen interval (listen interval) cycle, to listen to the beacon frame broadcast by the AP. If the STA obtains the beacon frame through listening, and determines, from the beacon frame, that the AP stores data of the STA, the STA requests the AP to obtain the data; or if the STA determines, from the beacon frame, that the AP does not store data of the STA, the STA continues to sleep.

A sleep scheduling manner 2 is a sleep scheduling manner based on a target wake time (target wake time, TWT) protocol. A TWT mechanism may be used in an energy saving scenario in a large-scale internet of things environment. Similar to the sleep scheduling manner 1, the sleep scheduling manner 2 is also a central sleep policy, that is, requires a central node for scheduling. For example, the STAs and the AP negotiate to establish a schedule, and the schedule may include a TWT time period. The AP performs sleep scheduling on each STA in a network topology based on the schedule.

Figure 2:
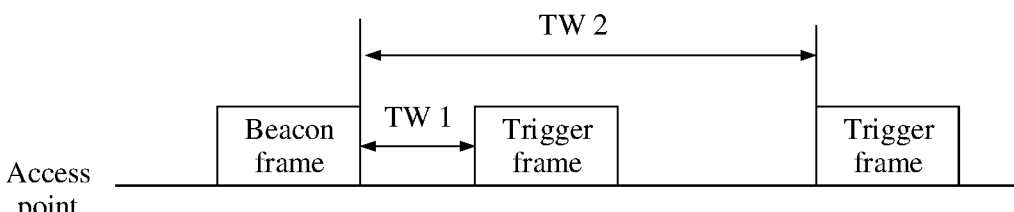
FIG. 2 is a schematic diagram of operation of TWT.
Figure 2:
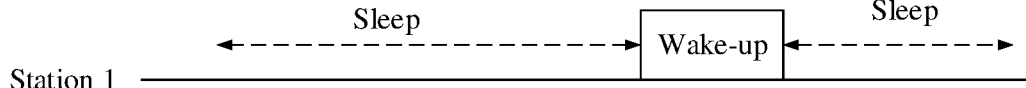
Figure 2:
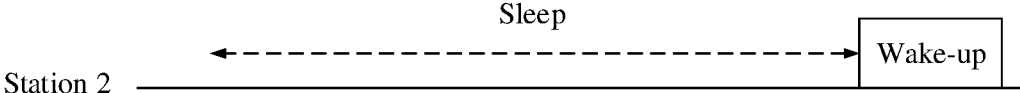

For ease of understanding, FIG. 2 is a schematic diagram of operation of TWT. Generally, a TWT time period negotiated by the STA and the AP includes one or more beacon periods. After the time period negotiated by the STA and the AP arrives, the STA wakes up, and waits for a trigger frame sent by the AP to perform data interaction. When the STA completes data interaction, the STA enters a sleep state. Each STA independently negotiates a TWT time period with the AP, and each STA has a separate TWT time period. As shown in the figure, TWT time periods of a STA 1 and a STA 2 are respectively TW 1 and TW 2, that is, wake-up time of the STA 1 and the STA 2 are different. The AP may also group the plurality of STAs based on the specified TWT time periods. In this way, the AP can schedule the plurality of STAs at the same time, thereby improving scheduling efficiency.

A sleep scheduling manner 3 is a sleep scheduling manner based on a notice of absence (notice of absence, NOA) protocol. The NOA protocol may be used in a network topology established based on a peer-to-peer (Peer-to-Peer, P2P) protocol. A general idea of the NOA protocol is as follows: A central node determines time for entering and exiting sleep, and a secondary node sleeps and wakes up simultaneously with the central node based on decision of the central node. For example, the central node sends NOA information to the secondary node, so that the secondary node sleeps and wakes up simultaneously with the central node based on the received NOA information.

Figure 3:
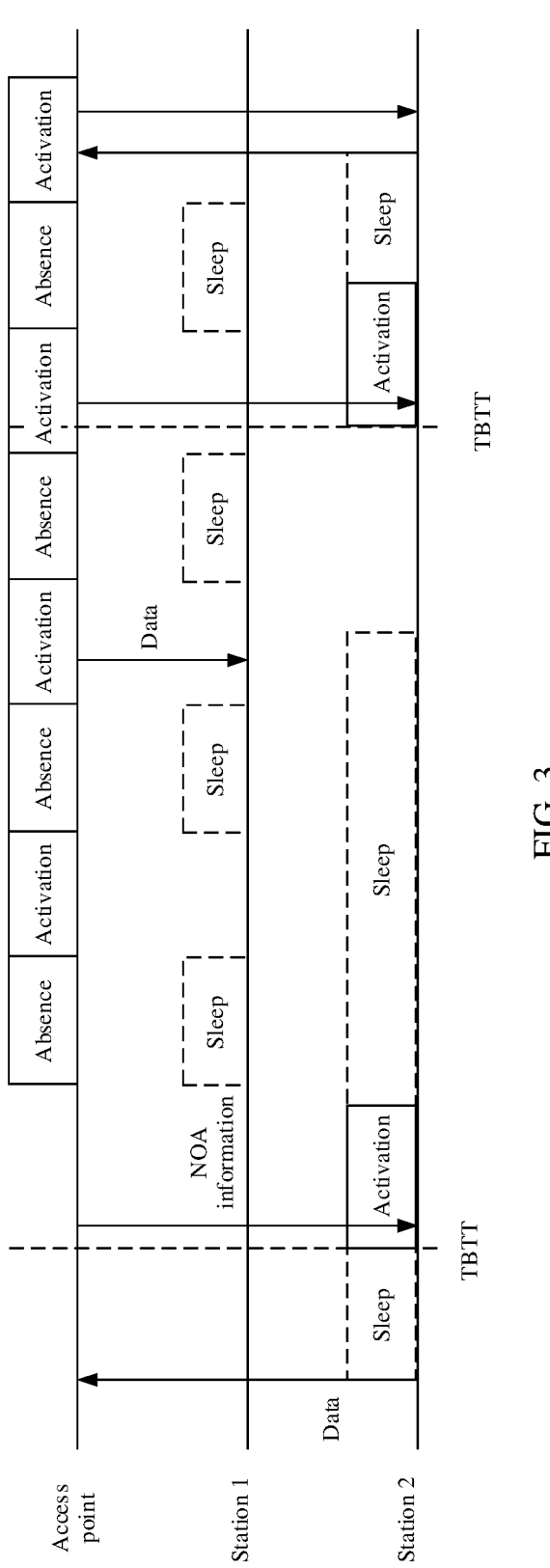
FIG. 3 is a schematic diagram of operation of NOA.

For ease of understanding, FIG. 3 is a schematic diagram of operation of NOA. A central node configures time for entering and exiting sleep and generates NOA information. The central node sends the NOA information to one or more secondary nodes by using a beacon frame or the like. Any secondary node receives the NOA information, and sleeps or exits sleep based on the NOA information. For example, the central node is an AP, and the secondary node is a STA. The AP sends the beacon frame carrying the NOA information, and a STA 1 and a STA 2 receive the beacon frame at target beacon transmission time (target beacon transmission time, TBTT), and may set, based on the NOA information carried in the beacon frame, sleep time to be consistent with the sleep time of the AP. Herein, the TBTT may be considered as a time interval at which the AP continuously sends two beacons.

The foregoing three sleep scheduling manners each may be considered as a scheduling manner based on the central node. For example, in the sleep scheduling manner 1, the AP serves as the central node to maintain connections between the plurality of STA devices. For another example, in the sleep scheduling manner 2, each STA independently negotiates a TWT time period with the AP, and the AP maintains connections between the plurality of STA devices. For still another example, in the sleep scheduling manner 3, the AP may be considered as the central node, and the plurality of STAs sleep and wake-up simultaneously with the AP based on the NOA information of the AP. However, as service types or requirements increase, more services may need to be implemented through collaboration between any devices in a network. It is apparent that a one-to-one or one-to-many network topology cannot meet running of this type of services. To support this type of services, a many-to-many network topology is proposed, that is, there is no fixed central node in the network topology, and any device can operate together to implement this type of services.

However, the foregoing three sleep scheduling manners each may be considered as a scheduling manner based on the central node, and cannot be applied to the many-to-many network topology. Further, in the sleep scheduling manner 1, each STA needs to send a request to the AP each time to trigger the AP to send the cached data to the STA. For the STA, signaling overheads are high, and data obtaining efficiency is low. In the sleep scheduling manner 3, the NOA information is set simply and fixedly. Once the NOA information is set, the NOA information is generally fixed, unless the NOA information is reset or the set NOA information is canceled. However, there may be a burst service in the network topology. It is apparent that the sleep scheduling manner 3 cannot meet a scenario of the burst service.

In view of this, embodiments of this application provide a sleep scheduling method in a distributed system, to reduce power consumption of each device as much as possible without affecting normal service interaction.

The sleep scheduling method provided in embodiments of this application is applied to a plurality of distributed systems, for example, the following distributed systems:

A distributed system 1 is a one-to-one connection or one-to-many connection system, for example, a distributed system established based on a wireless fidelity peer-to-peer (wireless fidelity Peer-to-Peer, Wi-Fi P2P) protocol defined based on the Wireless Fidelity (wireless fidelity, Wi-Fi) Alliance (Wi-Fi alliance, WFA). The Wi-Fi P2P protocol is a peer-to-peer connection technology, and enables a plurality of Wi-Fi devices to form a network (Network) without an access point (also referred to as an access node) (access point, AP). The network may also be referred to as a P2P network or a P2P group (Group), and the plurality of Wi-Fi devices in the network can communicate with each other. A general principle of the Wi-Fi P2P protocol is as follows: A transmission control protocol (transmission control protocol, TCP) link/An internet protocol (internet protocol, IP) link may be directly established between two workstations (also referred to as stations) (Stations, STAs). One of the two STAs may be considered as a conventional AP, and is referred to as a group owner (group owner, GO). The other STA of the two STAs may be referred to as a group client (group client, GC). That is, the GC is similar to a STA, and the GO is similar to an AP. In this case, the GC may also be connected to the GO, which is similar to a case in which the STA is connected to the AP. It should be understood that one GO in the P2P network or P2P group may correspond to one GC, or may correspond to a plurality of GCs, that is, the GO and the GC may be in a one-to-one relationship, or may be in a one-to-many relationship.

Figure 4:
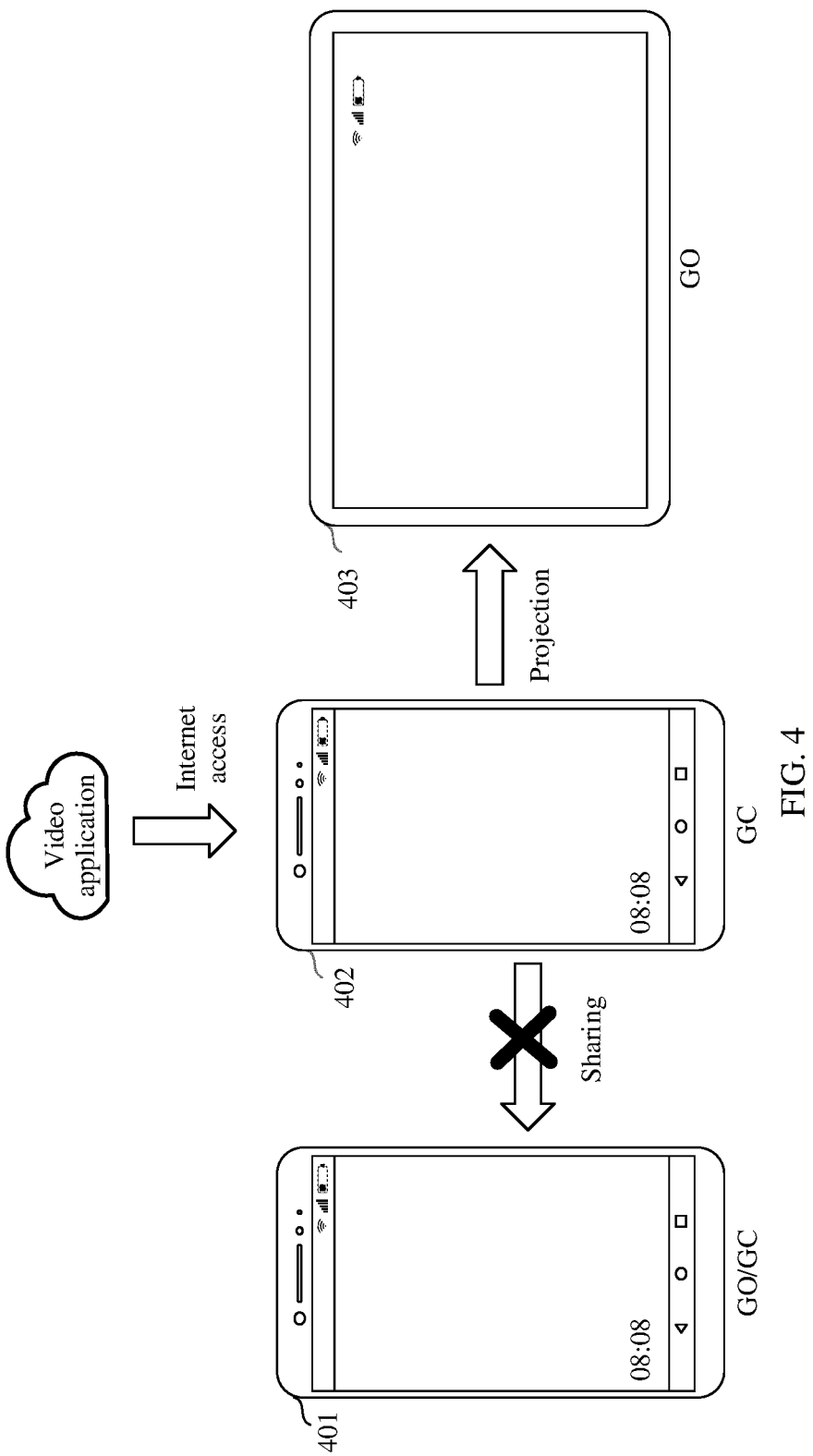
FIG. 4 is a schematic diagram of an architecture of a first distributed system according to an embodiment of this application.

For example, FIG. 4 shows a network architecture of a distributed system 1. Three terminal devices are included in FIG. 4, and the three terminal devices are respectively a terminal device 401, a terminal device 402, and a terminal device 403 that are located in one network. In FIG. 4, an example in which the terminal device 401 and the terminal device 402 each are a mobile phone, and the terminal device 403 is a PAD is used. In FIG. 4, after the terminal device 401, the terminal device 402, and the terminal device 403 initially establish a link, the terminal device 403 is a GO, and the terminal device 401 and the terminal device 402 each are a GC. The terminal device 403 may perform a cooperative service with the terminal device 401, or may perform a cooperative service with the terminal device 402. For example, as shown in FIG. 1, the terminal device 403 and the terminal device 402 may perform a projection service. If a cooperative service exists in any two GCs in a plurality of interconnected devices, because the GCs cannot communicate with each other, it is apparent that the cooperative service cannot be performed. For example, as shown in FIG. 4, information needs to be shared between the terminal device 401 and the terminal device 402. However, because the terminal device 401 and the terminal device 402 each are a GC, the terminal device 402 and the terminal device 103 need to be disconnected due to role limitation of the terminal device 402 and the terminal device 401. A link between the terminal device 401 and the terminal device 402 is re-established, so that the terminal device 401 is a GO, thereby sharing the information with the terminal device 402. Otherwise, the information cannot be shared between the terminal device 402 and the terminal device 401. After the link between the terminal device 401 and the terminal device 402 is re-established, one of the terminal device 401 and the terminal device 402 functions as the GO, and the other terminal device functions as the GC. For example, in FIG. 4, an example in which the terminal device 401 functions as the GO, and the terminal device 402 functions as the GC is used. In other words, a role of a device may change with an established link. For example, the role of the terminal device 401 is the GC after the terminal device 401 initially establishes a link, and the role of the terminal device 401 is the GO after the link is re-established.

It should be understood that the Wi-Fi P2P protocol is developed based on an 802.11 protocol framework, and belongs to a centralized network communication structure. In other words, Wi-Fi P2P requires that each terminal device needs to be configured with a role, for example, may be a GO or a GC. As a central node, the GO can communicate with any GC node connected to the GO. However, GOs cannot communicate with each other and GCs cannot communicate with each other. For example, the terminal device 402, the terminal device 401, and the terminal device 403 perform multi-screen collaborative video viewing. If the terminal device 402 uses an information sharing function, information can be shared between the terminal device 402 and the terminal device 401 only after a connection between the terminal device 402 and the terminal device 403 is disconnected due to role limitation of the terminal device 403 and the terminal device 401. Otherwise, information cannot be shared between the terminal device 402 and the terminal device 401.

A distributed system 2 is a one-to-one connection, one-to-many connection, or many-to-many connection system. For example, devices discover each other based on Bluetooth or Wi-Fi, and establish a connection to a discovered device; and then negotiate, through an established communication channel, link information for establishing Wi-Fi direct communication with each other, and implement Wi-Fi direct communication between the devices based on the link information, thereby forming the distributed system. Because the communication connection is established after the devices are discovered, and then the link information for establishing the Wi-Fi direct communication between the devices is negotiated through the communication channel established between the devices, there is no need to allocate a specific role to each device. The devices may be in a one-to-one relationship, a one-to-many relationship, or a many-to-many relationship. Roles of the devices in the established distributed system are equivalent. In this way, a distributed service can be coordinated between any devices, and the distributed service is not restricted due to role issues.

For example, a first device in a distributed system may be projected to a second device, and a file may be shared between the first device and a third device without a role conflict.

Figure 5:
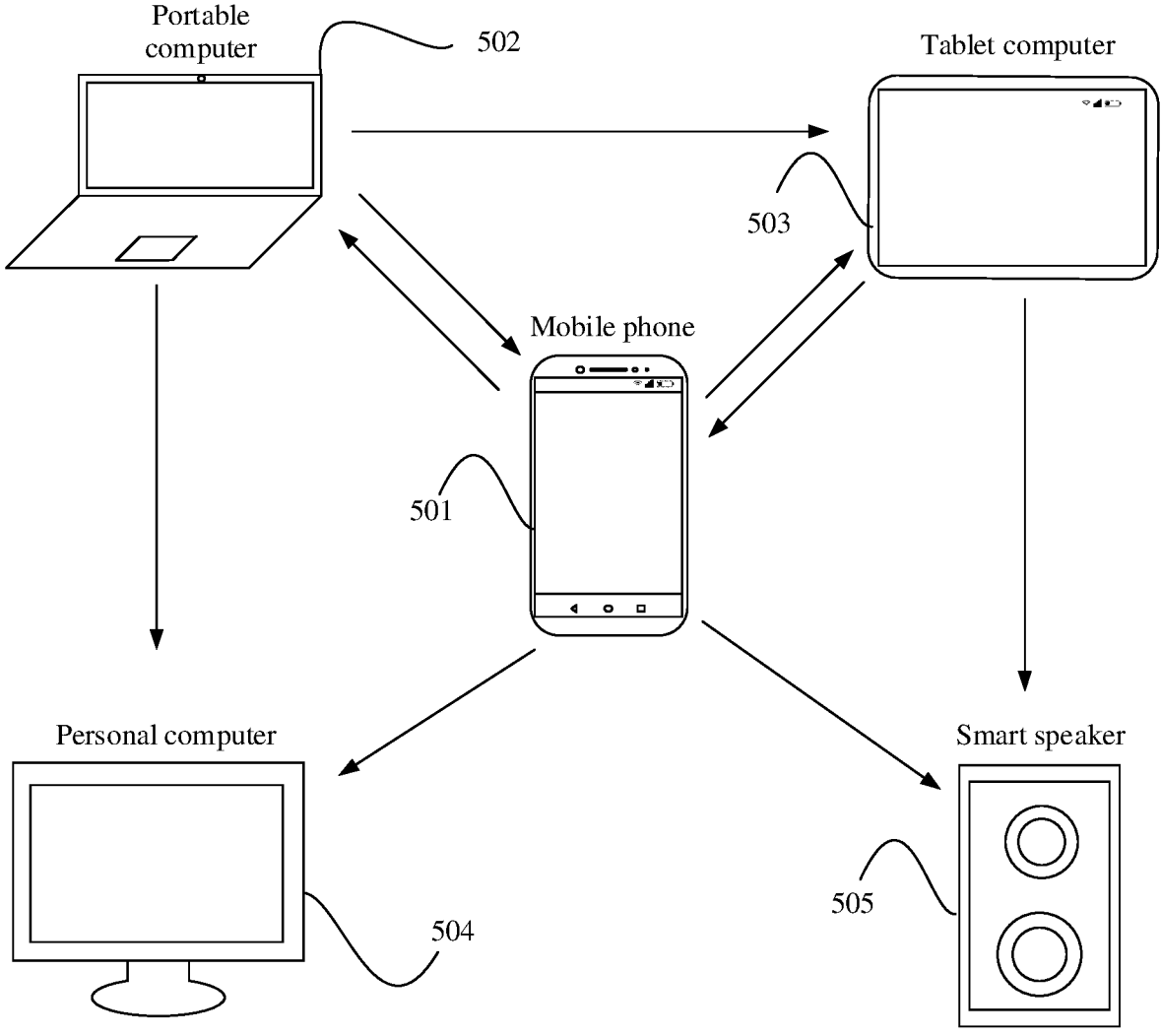
FIG. 5 is a schematic diagram of an architecture of a second distributed system according to an embodiment of this application.

For example, FIG. 5 is a schematic diagram of a distributed system. In FIG. 5, an example in which the distributed system includes five devices is used. It should be understood that the five devices are located in a same network. The five devices are respectively a device 501, a device 502, a device 503, a device 504, and a device 505. Multi-screen collaboration, information sharing, or the like may be performed between the device 501, the device 502, the device 503, the device 504, and the device 505. For example, the device 501 may perform multi-screen collaboration or information sharing with the device 502 or the device 503, the device 502 and the device 504 may perform multi-screen collaboration, and the device 503 and the device 505 may perform information sharing. In FIG. 5, an example in which the device 501 is a mobile phone, the device 502 is a portable computer, the device 503 is a tablet computer, the device 504 is a personal computer, and the device 505 is a smart speaker is used.

The device 501 is used as an example. The device 501 may broadcast a discovery message through a Bluetooth communication channel. The discovery message is used to discover one or more devices, for example, the device 502 to the device 505. Any device in the device 502 to the device 505, for example, the device 503, receives the discovery message, and may send a response message for the discovery message to the device 501. The device 501 receives the response message, and may establish a Bluetooth connection to the device 503 based on the response message. Likewise, another device may also establish a Bluetooth connection to the device 501. After establishing a Bluetooth connection with each device, the device 501 may negotiate to establish link information for Wi-Fi direct communication, and establish Wi-Fi direct communication with each other based on the link information, so as to form a distributed system 2.

The sleep scheduling method provided in embodiments of this application is applied to a plurality of scenarios, for example, the following scenarios.

Scenario 1 is also referred to as a keepalive scenario, that is, there is no service data interaction between a plurality of interconnected devices. For example, the plurality of devices establish connections to form a distributed system. However, currently, no device in the distributed system has a to-be-performed service, and naturally, data interaction is not required between devices. In this case, any device in the distributed system may be in a sleep state, so as to reduce power consumption as much as possible. It should be understood that, even if the devices are in the sleep state, links between the devices keep in a connected state, to maintain interaction of a part of data (namely, keepalive data) between the devices, for example, interaction of small-traffic and delay-insensitive data, without affecting normal working between the devices.

Scenario 2 is also referred to as a service scenario, that is, there is service data interaction between a plurality of interconnected devices. For example, a mobile phone is a projection initiation device, a PC 1, a PC 2, and a PC 3 are projection service devices, and the mobile phone projects to or shares a document with the PC 1, the PC 2, and the PC 3. In this case, each device can be independently scheduled based on a specific service form of each device in the distributed system, for example, a service being performed or a service not being performed, so that each device enters sleep as much as possible without affecting a service delay throughput, thereby reducing power consumption.

Scenario 3 is also referred to as a service burst scenario, that is, a burst service is generated between a plurality of interconnected devices. In this case, each device in the distributed system can be flexibly scheduled, so that data of the burst service is transmitted as quickly as possible, without affecting overall sleep of the distributed system as much as possible.

The foregoing describes several application scenarios of embodiments of this application. Certainly, in addition to the foregoing scenarios, embodiments of this application are applied to another scenario. This is not specifically limited. This can reduce, in various application scenarios, power consumption of each device as much as possible without affecting normal service interaction. In embodiments of this application, a minimum sleep and wake-up time (unit) may be defined in a time dimension. For example, a slot of 16 ms is used as the minimum sleep and wake-up time, and N minimum sleep and wake-up time is used as a sleep and wake-up period, where N is an integer greater than 2.

Figure 6:
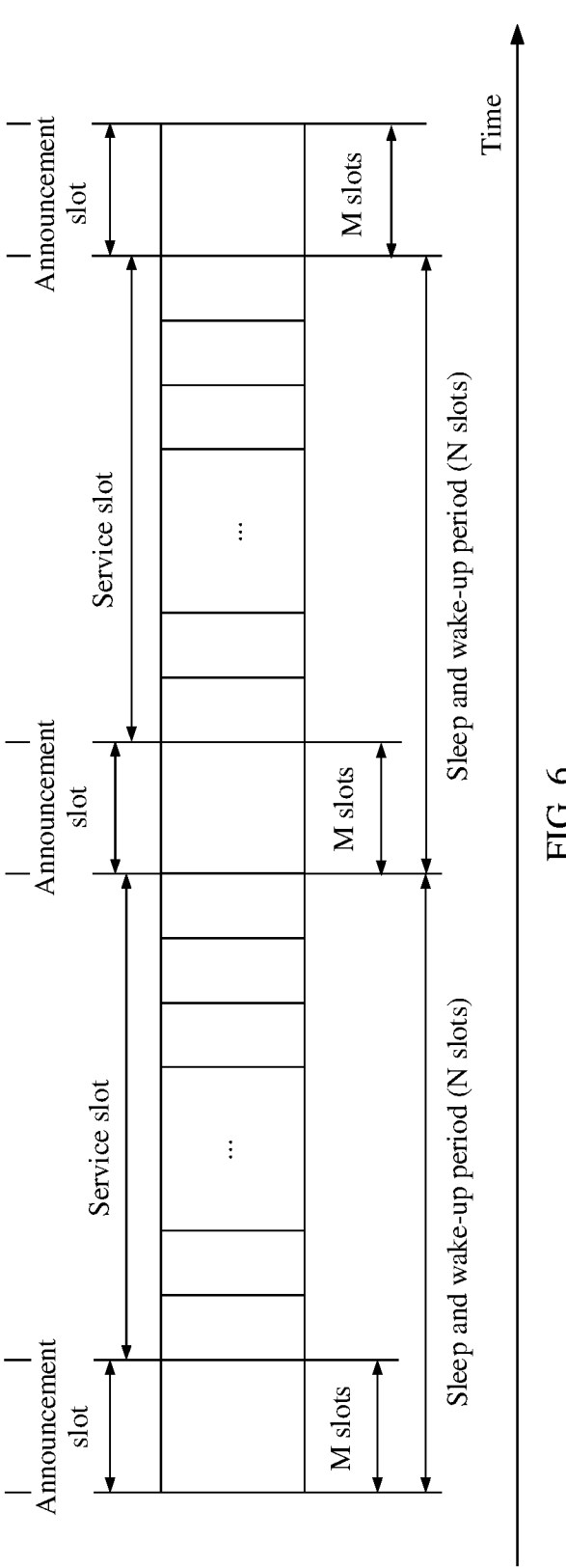
FIG. 6 is a schematic diagram of a sleep/wake cycle according to an embodiment of this application.

FIG. 6 is a schematic diagram of a sleep and wake-up period. Slots included in the sleep and wake-up period may be divided into an announcement slot and a service slot. The announcement slot is, for example, first M slots in the sleep and wake-up period, and is used by each device in the distributed system to notify a sleep and wake-up status of the device in the sleep and wake-up period. A slot after the announcement slot is the service slot, and is mainly used to perform data receiving and sending.

In embodiments of this application, any device in the distributed system, for example, a first device, is used as an example. The first device may send a periodic notification frame (periodical notify frame, PNF) in the announcement slot, where the PNF is used to indicate a sleep and wake-up status of the first device in the entire sleep and wake-up period. Each device in the distributed system receives a PNF from another device, and may determine and update sleep and wake-up time of the device with reference to a sleep and wake-up status of the device. For example, in embodiments of this application, a sleep and wake-up scheduling table may be established, and the sleep and wake-up scheduling table may be used to indicate sleep and wake-up time of each device in the distributed system. For example, the sleep and wake-up scheduling table is a bitmap (bitmap) with a size of K*N, where K is a quantity of devices included in the distributed system, and N is a quantity of slots in the sleep and wake-up period. Because the sleep and wake-up scheduling table includes sleep and wake-up information of each device in the distributed system, each device may select, based on the sleep and wake-up scheduling table, another appropriate device to perform a distributed service coordinately. Because each device in the distributed system does not need to rely on a fixed device in the distributed system, for example, a central node, to update the sleep and wake-up scheduling table, the sleep scheduling method provided in embodiments of this application can be applied to the many-to-many connection scenario. In addition, any device actively performs the distributed service, that is, data transmission, based on the sleep and wake-up scheduling table, and does not need to send a request in advance to trigger a peer party to send data. Compared with the foregoing sleep scheduling manner 1, this manner can reduce signaling overheads between devices, and improve data transmission efficiency. Each device dynamically updates a sleep and wake-up status of the device based on a sleep and wake-up status of another device. The sleep and wake-up status may change flexibly. Compared with the foregoing sleep scheduling manner 3, this manner can meet an actual transmission requirement of the burst service.

The technical solutions provided in embodiments of this application are applied to an electronic device, for example, any device that forms the distributed system 1 or the distributed system 2. The following describes the electronic device and embodiments for using such an electronic device. In some embodiments of this application, the electronic device may be a portable electronic device, such as a mobile phone, a PAD, a portable computer, a wearable device (such as a smartwatch, smart glasses, a smart band, or a smart helmet) with a wireless communication function, or a vehicle-mounted device. An example embodiment of the portable electronic device includes but is not limited to a portable electronic device using iOS®, Android®, Microsoft®, or another operating system. It should be further understood that, in some other embodiments of this application, the electronic device may not be a portable device, for example, may be a desktop computer such as a PC, or may be a device such as a television.

Figure 7A:
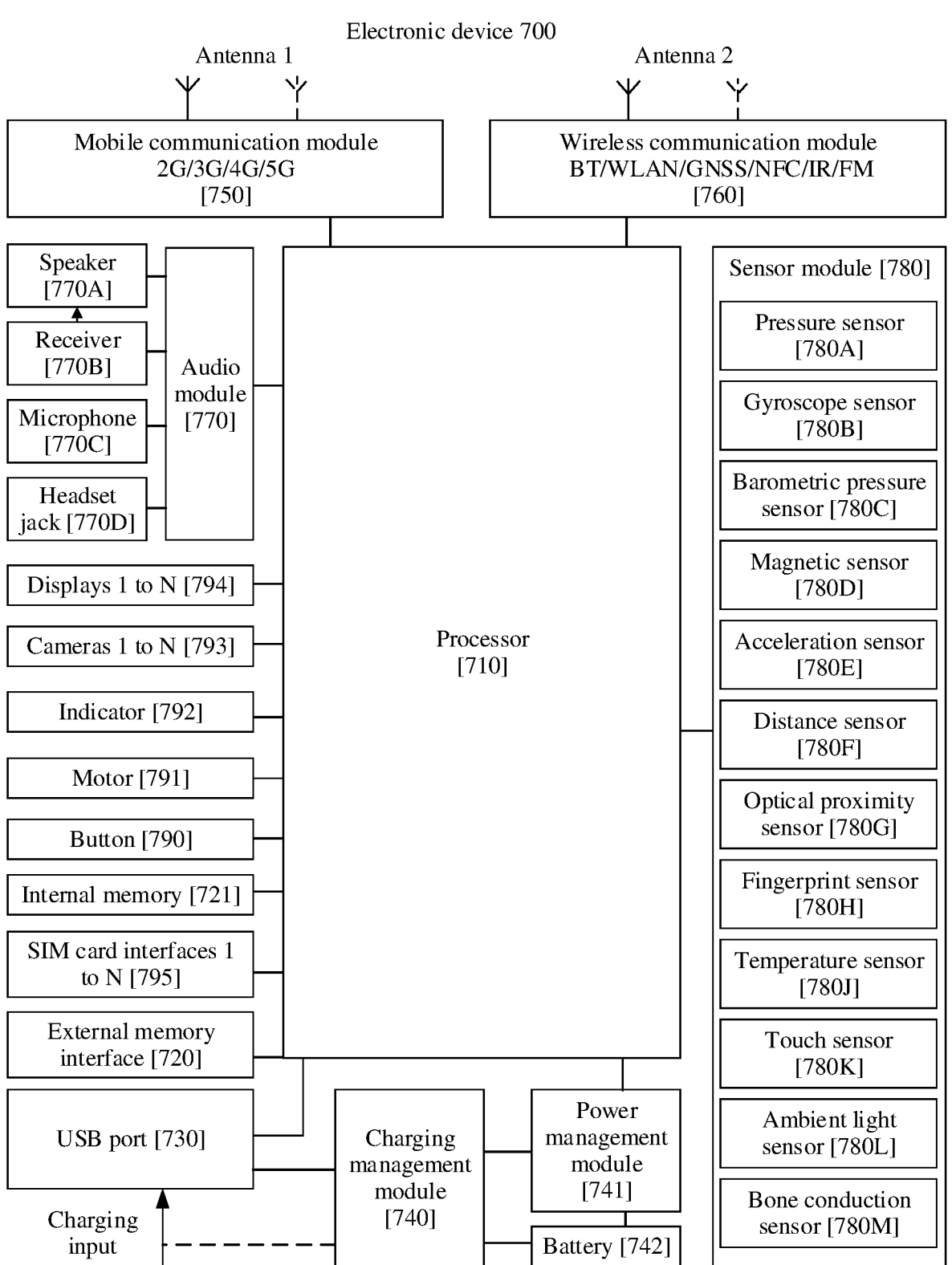
FIG. 7A is a schematic diagram of a hardware structure of an electronic device according to an embodiment of this application.

For example, FIG. 7A is a schematic diagram of a structure of an electronic device 700.

It should be understood that the electronic device 700 shown in the figure is merely an example, and the electronic device 700 may have more or fewer components than those shown in the figure, may combine two or more components, or may have different component configurations. Various components shown in the figure may be implemented in hardware including one or more signal processing and/or application-specific integrated circuits, software, or a combination of hardware and software.

As shown in FIG. 7A, the electronic device 700 may include a processor 710, an external memory interface 720, an internal memory 721, a universal serial bus (universal serial bus, USB) port 730, a charging management module 740, a power management module 741, a battery 742, an antenna 1, an antenna 2, a mobile communication module 750, a wireless communication module 760, an audio module 770, a speaker 770A, a receiver 770B, a microphone 770C, a headset jack 770D, a sensor module 780, a button 790, a motor 791, an indicator 792, a camera 793, a display 794, a subscriber identification module (subscriber identification module, SIM) card interface 795, and the like. The sensor module 780 may include a pressure sensor 780A, a gyroscope sensor 780B, a barometric pressure sensor 780C, a magnetic sensor 780D, an acceleration sensor 780E, a distance sensor 780F, an optical proximity sensor 780G, a fingerprint sensor 780H, a temperature sensor 780J, a touch sensor 780K, an ambient light sensor 780L, a bone conduction sensor 780M, and the like.

The following specifically describes each component of the electronic device 700 with reference to FIG. 7A.

The processor 710 may include one or more processing units. For example, the processor 710 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device 700. The controller may generate an operation control signal based on an instruction operation code and a time sequence signal, to complete control of instruction reading and instruction execution.

A memory may be disposed in the processor 710, and is configured to store instructions and data. In some embodiments, the memory in the processor 710 is a cache. The memory may store instructions or data just used or cyclically used by the processor 710. If the processor 710 needs to use the instructions or the data again, the processor 710 may directly invoke the instructions or the data from the memory. This can avoid repeated access, reduce waiting time of the processor 710, and improve system efficiency.

The processor 710 may run an information sharing method provided in embodiments of this application. For example, an embodiment of this application provides a fast collaborative service (Fast Collaborative Service). The fast collaborative service may be a software module, the software module may run on the processor 710, and the software module may be understood as a computer program. For example, the software module may provide a system-level capability. An Android system is used as an example, from a perspective of a service, the software module may be placed in a system_server (system_server) process, and construct a basic platform capability together with modules such as an activity manager service (activity manager service, AMS), a package manager service (package manager service, PMS), or a window manager service (window manager service) in the system_server process. Alternatively, from an implementation perspective, in addition to the system_server process, the fast collaborative service may also be placed in another process. When different components are integrated in the processor 710, for example, a CPU and a GPU are integrated, the CPU and the GPU may cooperate to perform the method provided in embodiments of this application. For example, in the method provided in embodiments of this application, some algorithms are performed by the CPU, and the other algorithms are performed by the GPU, to obtain fast processing efficiency.

In some embodiments, the processor 710 may include one or more interfaces. For example, the interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The USB port 730 is a port that conforms to a USB standard specification, and may be specifically a mini USB port, a micro USB port, a USB type-C port, or the like. The USB port 730 may be configured to connect to a charger to charge the electronic device 700, or may be configured to transmit data between the electronic device 700 and a peripheral device. The charging management module 740 is configured to receive charging input from the charger. The power management module 741 is configured to connect the battery 742, the charging management module 740, and the processor 710. The power management module 741 receives input of the battery 742 and/or the charging management module 740, to supply power to the processor 710, the internal memory 721, an external memory, the display 794, the camera 793, the wireless communication module 770, and the like.

The I2C interface is a bidirectional synchronization serial bus, and includes a serial data line (serial data line, SDA) and a serial clock line (serial clock line, SCL). In some embodiments, the processor 710 may include a plurality of groups of I2C buses. The processor 710 may be separately coupled to the touch sensor 780K, a charger, a flash, the camera 793, and the like through different I2C bus interfaces. For example, the processor 710 may be coupled to the touch sensor 780K through the I2C interface, so that the processor 710 communicates with the touch sensor 780K through the I2C bus interface, to implement a touch function of the electronic device 700.

The mobile industry processor interface (mobile industry processor interface, MIPI) interface may be configured to connect the processor 710 to peripheral components such as the display 794 and the camera 793. The MIPI interface includes a camera serial interface (camera serial interface, CSI), a display serial interface (display serial interface, DSI), and the like. In some embodiments, the processor 710 communicates with the camera 793 via the CSI, to implement a photographing function of the electronic device 700. The processor 710 communicates with the display 794 through the DSI interface, to implement a display function of the electronic device 700.

The GPIO interface may be configured by software. The GPIO interface may be configured as a control signal or a data signal. In some embodiments, the GPIO interface may be configured to connect the processor 710 to the camera 793, the display 794, the wireless communication module 760, the audio module 770, the sensor module 780, and the like. The GPIO interface may alternatively be configured as an I2C interface, an I2S interface, a UART interface, an MIPI interface, or the like.

A wireless communication function of the electronic device 700 may be implemented by using the antenna 1, the antenna 2, the mobile communication module 750, the wireless communication module 760, the modem processor, the baseband processor, and the like. The antenna 1 and the antenna 2 are configured to receive and transmit electromagnetic wave signals. Each antenna in the electronic device 700 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communication module 750 may provide a wireless communication solution that is applied to the electronic device 700 and that includes 2G/3G/4G/5G or the like. The mobile communication module 750 may include at least one filter, a switch, a power amplifier, a low noise amplifier (low noise amplifier, LNA), and the like. The mobile communication module 750 may receive an electromagnetic wave through the antenna 1, perform processing such as filtering or amplification on the received electromagnetic wave, and transmit the processed electromagnetic wave to the modem processor for demodulation. The mobile communication module 750 may further amplify a signal modulated by the modem processor, and convert the signal into an electromagnetic wave for radiation through the antenna 1. In some embodiments, at least some function modules in the mobile communication module 750 may be disposed in the processor 710. In some embodiments, at least some function modules of the mobile communication module 750 may be disposed in a same component as at least some modules of the processor 710.

The wireless communication module 760 may provide a wireless communication solution that is applied to the electronic device 700 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 760 may be one or more components integrating at least one communication processor module. The wireless communication module 760 receives an electromagnetic wave through the antenna 2, performs frequency modulation and filtering processing on an electromagnetic wave signal, and sends a processed signal to the processor 710. The wireless communication module 760 may further receive a to-be-sent signal from the processor 710, perform frequency modulation and amplification on the signal, and convert the signal into an electromagnetic wave for radiation through the antenna 2.

In some embodiments, the antenna 1 and the mobile communication module 750 in the electronic device 700 are coupled, and the antenna 2 and the wireless communication module 760 in the electronic device 700 are coupled, so that the electronic device 700 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

It may be understood that an interface connection relationship between modules shown in this embodiment of this application is merely an example for description, and does not constitute a limitation on the structure of the electronic device 700. In some other embodiments of this application, the electronic device 700 may alternatively use an interface connection manner different from that in the foregoing embodiment, or use a combination of a plurality of interface connection manners.

The electronic device 700 may implement a display function through the GPU, the display 794, the application processor, and the like. The GPU is a microprocessor for image processing, and is connected to the display 794 and the application processor. The GPU is configured to: perform mathematical and geometric computation, and render an image. The processor 710 may include one or more GPUs, which execute program instructions to generate or change display information.

The display 794 is configured to display an image, a video, and the like. The display 794 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like.

The electronic device 700 may implement a photographing function or an image capture function by using the ISP, the camera 793, the video codec, the GPU, the display 794, the application processor, and the like.

The ISP is configured to process data fed back by the camera 793. For example, during photographing, a shutter is opened, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 793.

The camera 793 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 700 may include one or N cameras 793, where N is a positive integer greater than 1.

The digital signal processor is configured to process a digital signal, and may process another digital signal in addition to the digital image signal. For example, when the electronic device 700 selects a frequency, the digital signal processor is configured to perform Fourier transformation on frequency energy.

The video codec is configured to compress or decompress a digital video. The electronic device 700 may support one or more video codecs. In this way, the electronic device 700 may play or record a video in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 700 may be implemented through the NPU, for example, image recognition, facial recognition, speech recognition, and text understanding.

The internal memory 721 may be configured to store computer-executable program code, where the executable program code includes instructions. The internal memory 721 may include a program storage area and a data storage area. The program storage area may store an operating system, an application required by at least one function (for example, a voice playing function or an image playing function), and the like. The data storage area may store data (such as audio data and an address book) created during use of the electronic device 700, and the like. In addition, the internal memory 721 may include a high-speed random access memory, or may include a nonvolatile memory, for example, at least one magnetic disk storage device, a flash memory, or a universal flash storage (universal flash storage, UFS). The processor 710 runs instructions stored in the internal memory 721 and/or instructions stored in the memory disposed in the processor, to perform various function applications and data processing of the electronic device 700.

The external memory interface 720 may be configured to be connected to an external storage card, for example, a micro SD card, to extend a storage capability of the electronic device. The external storage card communicates with the processor 710 through the external memory interface 720, to implement a data storage function. For example, files such as pictures or videos are stored in the external storage card.

The electronic device 700 may implement an audio function, such as music playing and recording by using the audio module 770, the speaker 770A, the receiver 770B, the microphone 770C, the headset jack 770D, the application processor, and the like.

The button 790 includes a power button, a volume button, and the like. The button 790 may be a mechanical button, or may be a touch button. The electronic device 700 may receive button input, and generate button signal input related to user setting and function control of the electronic device 700. The motor 791 may generate a vibration prompt. The motor 791 may be configured to provide an incoming call vibration prompt and a touch vibration feedback. For example, touch operations performed on different applications (for example, photographing and audio playing) may correspond to different vibration feedback effect. Touch vibration feedback effect may be customized. The indicator 792 may be an indicator light, and may be configured to indicate a charging status and a power change, or may be configured to indicate a message, a missed call, a notification, and the like. The SIM card interface 795 is configured to connect to a SIM card. The SIM card may be inserted into the SIM card interface 795 or removed from the SIM card interface 795, to implement contact and separation from the electronic device 700.

It can be understood that the components shown in FIG. 7A do not constitute a specific limitation on the electronic device 700. The mobile phone may further include more or fewer components than those shown in the figure, or combine some components, or split some components, or have different component arrangements. In addition, a combination/connection relationship between the components in FIG. 7A may also be adjusted and modified.

A software system of the electronic device 700 may use a layered architecture, an event-driven architecture, a micro-kernel architecture, a micro service architecture, or a cloud architecture. In this embodiment of the present invention, an Android system of a layered architecture is used as an example to illustrate the software structure of the electronic device 700.

Figure 7B:
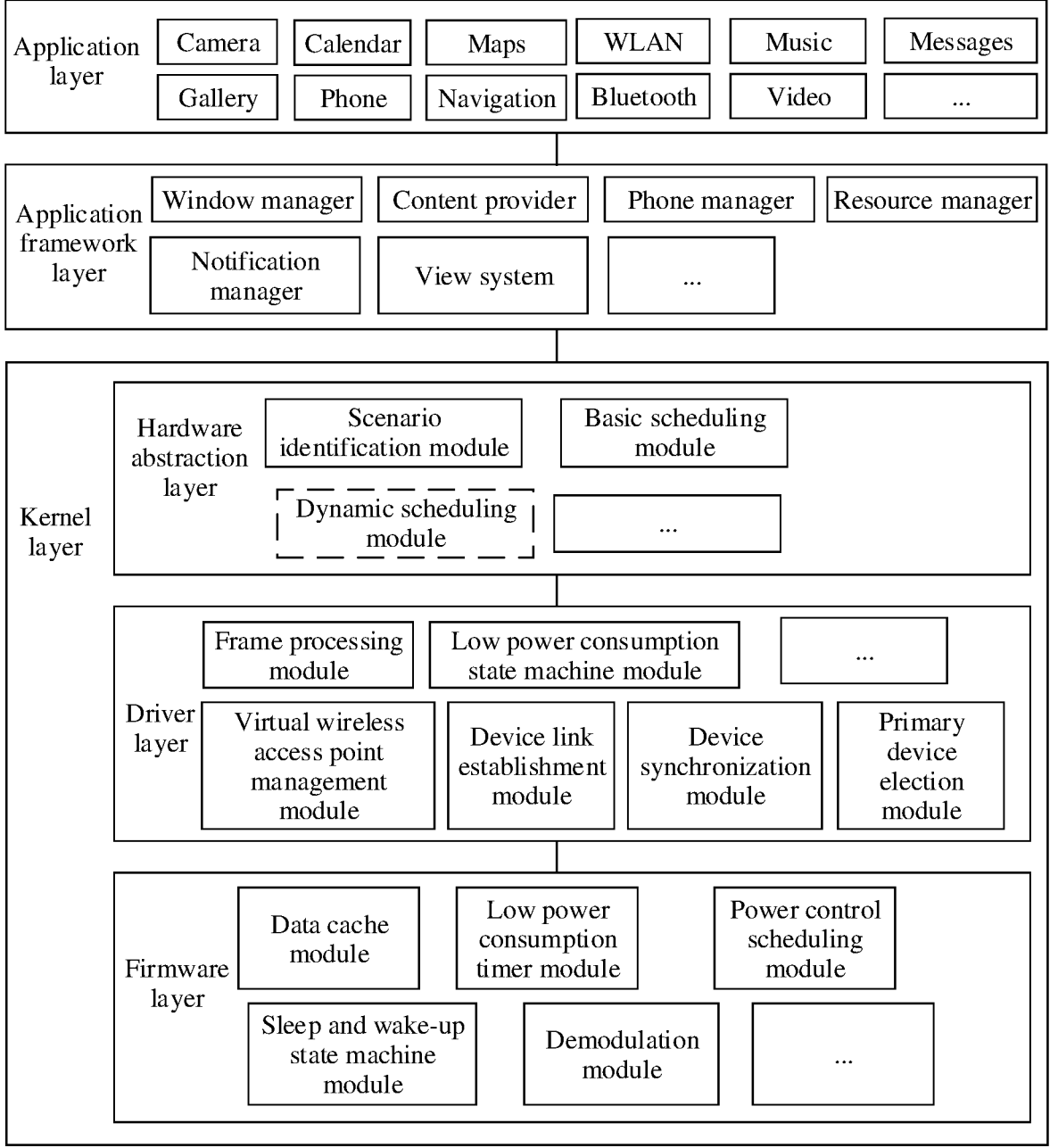
FIG. 7B is a schematic diagram of a software structure of an electronic device according to an embodiment of this application.

FIG. 7B is a block diagram of the software structure of the electronic device 700 in this embodiment of this application.

In a layered architecture, software is divided into several layers, and each layer has a clear role and task. The layers communicate with each other through a software interface.

In some embodiments, the Android system is divided into four layers: an application layer, an application framework layer, a system library, and a kernel layer from top to bottom.

The application layer may include a series of application packages. As shown in FIG. 7B, the application packages may include applications such as Camera, Gallery, Calendar, Phone, Maps, Navigation, WLAN, Bluetooth, Music, Video, and Messages.

The application framework layer provides an application programming interface (application programming interface, API) and a programming framework for an application at the application layer. The application framework layer includes some predefined functions. As shown in FIG. 7B, the application framework layer may include a window manager, a content provider, a view system, a phone manager, a resource manager, a notification manager, and the like. The window manager is configured to manage a window program. The window manager may obtain a size of a display, determine whether there is a status bar, perform screen locking, take a screenshot, and the like.

The content provider is used to store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 700, for example, management of a call status (including answering, declining, or the like).

The resource manager provides various resources for an application, such as a localized character string, an icon, an image, a layout file, and a video file.

The notification manager enables an application to display notification information in a status bar, and may be used to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, the electronic device vibrates, or the indicator light blinks.

The system library includes a core library and a virtual machine, and is responsible for scheduling and managing an operating system. The system library includes two parts: a function that needs to be invoked by a Java language and the core library of the operating system. The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL). The surface manager is configured to manage a display subsystem, and provide fusion of 2D and 3D layers for a plurality of applications. The media library supports playback and recording in a plurality of commonly used audio and video formats, and static image files. The media library may support a plurality of audio and video coding formats, for example, MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software, and provides an application programming interface (application programming interface, API) and a programming framework for the application framework layer. As shown in FIG. 7B, the kernel layer includes at least a hardware abstraction layer (hardware abstraction layer, HAL), a driver layer, and a firmware layer. The firmware layer is located between the driver layer and the hardware. A sleep scheduling service provided in embodiments of this application may be located at the kernel layer. For example, each algorithm related to the sleep scheduling service may exist at the kernel layer in a form of a corresponding function module in a form of an encapsulated interface.

The hardware abstraction layer is an interface layer located between an operating system kernel and a hardware circuit, and is configured to implement identification of a sleep scenario, scheduling of a sleep and wake-up scheduling table of the device, and/or power control of the device.

As shown in FIG. 7B, the hardware abstraction layer includes a scenario identification module and a basic scheduling module. The scenario identification module is an interface with the application framework layer, and may provide a capability of parsing a command of the application layer. An application at the application layer sets a scenario by using a command, and the scenario identification module may determine a current application scenario by parsing the command. The scenario identification module may notify the basic scheduling module of the determined scenario. The basic scheduling module may receive information indicating the scenario from the scenario identification module, generate a basic sleep and wake-up status of each link in a distributed system based on the scenario, and notify a low power consumption state machine module of the generated basic sleep and wake-up status of each link.

In some embodiments, the hardware abstraction layer may further include a dynamic scheduling module, configured to: when an emergency service arrives, determine, by cooperating with the low power consumption state machine module, whether the emergency service can be sent in a current sleep and wake-up period, and transfer the emergency service to the low power consumption state machine module in sleep and wake-up time obtained through dynamic negotiation. It should be noted that the dynamic scheduling module is not necessary and therefore is shown by using a dashed line in FIG. 7B.

The driver layer, also referred to as a (host media access control, HAMC) layer, is configured to implement a protocol stack, for example, generation and parsing of an element in a sleep and wake-up scheduling table in a PNF, maintenance of a sleep and wake-up status of each device, generation and parsing of a sleep dynamic negotiation frame, an interaction procedure and a state machine of sleep dynamic negotiation, and a protocol for power control interaction.

As shown in FIG. 7B, the driver layer may include a frame processing module, a low power state machine module, a virtual access point (virtual access point, VAP) management module, a device link establishment module, a device synchronization module, and a primary device selection module.

The frame processing module is mainly configured to parse and generate a related frame, for example, process a PNF, a dynamic negotiation frame, and a notification frame of a sleep and wake-up scheduling table. The low power state machine module is a low-power state machine, and is mainly configured to generate sleep and wake-up information of a device, and maintain a sleep and wake-up scheduling table. For example, the low power state machine module may be configured to generate, reset, and update the sleep and wake-up scheduling table. The low power state machine module may be configured to interact with another module. For example, the low power state machine module may notify another module of sleep and wake-up information of the device, dynamic negotiation information, and information required for generating various frames.

The VAP management module may be configured to create and delete VAPs. It should be understood that a VAP is as follows: One physical entity AP is virtualized into a plurality of APs, and each virtualized AP is one VAP, and each VAP provides a same function as the physical entity AP. A user can create different VAPs on one AP to provide wireless access services for different user groups.

The device link establishment module may be configured to perform related work such as link establishment and link disconnection between devices.

The device synchronization module may be configured to synchronize a device in a system.

The primary device selection module may be configured to select a primary device from a plurality of devices in a distributed system, and update the primary device.

The firmware layer, also referred to as a (device media access control, DMAC) layer, is mainly configured to directly control a hardware register. For example, the firmware layer may generate timer wake-up and a sleep interrupt offset based on a sleep and wake-up scheduling table, perform hardware timer interrupt wake-up based on a TSF offset, perform hardware timer interrupt sleep based on the TSF offset, cache data in a sleep state, configure power gating (power gating) registers for a deep sleep state and a light sleep state, and configure power ranges for an external power amplifier (power amplifier, PA) and a built-in a variable gain amplifier (variable gain amplifier, VGA).

As shown in FIG. 7B, the firmware layer may include a data cache module, a low power consumption timer module, a power control scheduling module, a sleep and wake-up state machine module, a demodulation module, and the like.

The data cache module is configured to manage cached data. For example, in a sleep (keepalive) state, the data cache module may cache data that arrives in sleep time of the device, or cache emergency service data that arrives but is not sent in time. When data cached in the data cache module is greater than a specific threshold, the data cache module may notify the low power consumption state machine module to increase wake-up time of the device.

The low power consumption timer module is mainly configured to process various interrupt events, distribution, and sleep related timers, so as to manage a start of each minimum sleep and wake-up time and a start of a sleep scheduling period.

The power control scheduling module is mainly configured to perform power control scheduling, for example, adjusting a power range based on information about a distance between devices and bit error feedback of a receiving end. For example, the power control scheduling module determines signal strength of reference signal received power (reference signal received power, RSRP) indicating information about a distance between the receiving end and a transmitting end, and converts the signal strength into different distance levels based on different signal strength, so as to obtain different transmit power range levels. For another example, the power control scheduling module performs dynamic power adjustment based on bit error information fed back by the receiving end. When a bit error fed back by the receiving end is high at a specific power level, the power is dynamically adjusted. When the bit error rate fed back by the receiving end is higher than a specific threshold, power range increase is triggered.

The sleep and wake-up state machine module may control a sleep and wake-up status of each device based on a sleep and wake-up scheduling table.

It should be noted that the foregoing function modules are merely examples. In actual application, the sleep scheduling service may be divided into more or fewer function modules based on other factors; or even if the sleep scheduling service is divided into eight function modules, functions of the function modules may be divided in another manner; or the sleep scheduling service may not be divided into function modules, but operate as a whole.

The following describes some working procedures of software and hardware of the electronic device 700 by using an example with reference to an application scenario.

Figure 8:
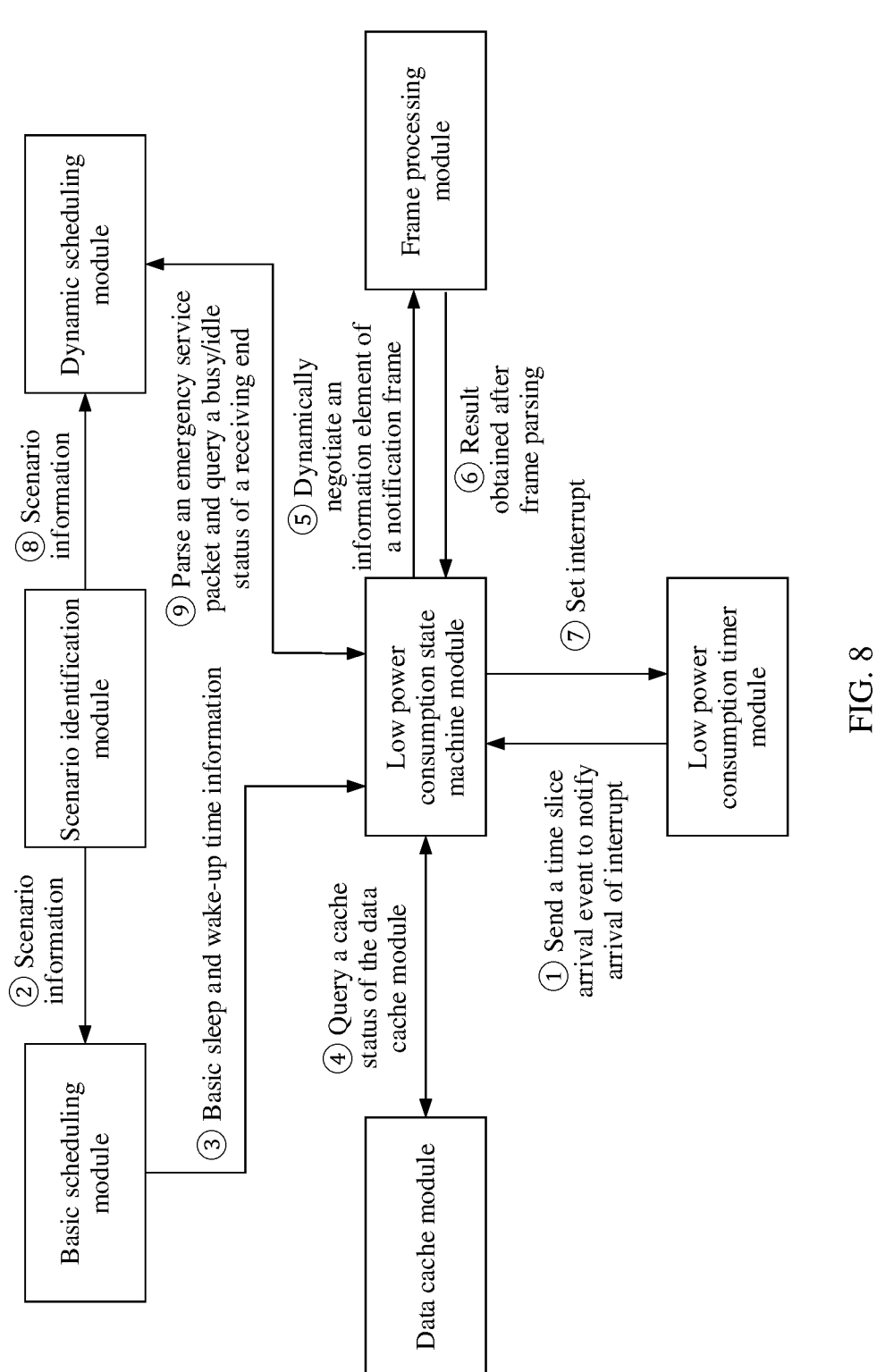
FIG. 8 is a schematic diagram of a scheduling relationship between function modules for implementing a sleep scheduling method according to an embodiment of this application.

FIG. 8 is a schematic diagram of a scheduling relationship between function modules for implementing the sleep scheduling method according to this embodiment of this application. As shown in ① in FIG. 8, in the electronic device 700, the firmware layer may set wake-up interrupt based on a sleep and wake-up scheduling table, and the wake-up interrupt triggers the low power consumption timer module to send a time slice arrival event to the low power consumption state machine module. The time slice arrival event is used to trigger the low power consumption timer module to set a start of sleep and wake-up time and a start of a sleep scheduling period. For example, when receiving the time slice arrival event, the low power consumption timer module may set a timer of 16 ms, namely, the start of the sleep and wake-up time. Certainly, the low power consumption timer module may further detect a current slot, for example, an announcement slot or a service slot. The device may perform service data receiving and sending based on the set sleep and wake-up time and the sleep and wake-up period.

As shown in ② in FIG. 8, when a service arrives, an application in the application layer may notify service information (scenario information) to the scenario identification module through an agreed interface. If the service changes, for example, a service type or a service feature changes, the scenario identification module may notify the basic scheduling module of latest service information.

As shown in ③ in FIG. 8, the basic scheduling module estimates a sleep and wake-up status of the device based on the latest service information and a current service situation, and notifies the low power consumption state machine module of an estimation result as basic sleep and wake-up time information.

As shown in ④ in FIG. 8, the low power state machine module receives and stores the basic sleep and wake-up time information from the basic scheduling module. The low power consumption state machine module first queries a cache status of the data cache module in an announcement slot of each sleep scheduling period, and then fills in the sleep and wake-up scheduling table based on the basic sleep and wake-up time information. In addition, when a volume of data cached by the data cache module exceeds a specific threshold, the data cache module may notify the low power consumption state machine module to temporarily add an operation slot. Then, the low power consumption state machine module sends a sleep and wake-up notification frame of the device in the current slot, namely, a PNF, to the frame processing module. Certainly, if there is an emergency service, the low power consumption state machine module also sends an information element (IE) for generating a dynamic negotiation notification frame to the frame processing module (as shown in ⑤ in FIG. 8).

As shown in ⑥ in FIG. 8, the frame processing module receives the PNF, parses the PNF, and notifies the low power consumption state machine module of a result of parsing the frame. The low power consumption state machine module may update the sleep and wake-up scheduling table based on the result sent by the frame processing module. The frame processing module receives the IE for generating the dynamic negotiation notification frame, and generates the dynamic negotiation frame based on the IE. In addition, during dynamic negotiation, the frame processing module also parses a received negotiation frame, and sends related information (for example, time information for negotiating to send data) obtained after parsing to the low power consumption state machine module, so that the low power consumption state machine module updates the sleep and wake-up scheduling table, modifies the interrupt, and sets a low power consumption timer.

As shown in ⑦ in FIG. 8, when the low power consumption timer expires, the low power consumption state machine module checks the sleep and wake-up scheduling table, and checks whether a next slot is 0 (namely, a wake-up slot). If the next slot is 0, the low power consumption state machine module sets offset interrupt based on a situation of the sleep and wake-up scheduling table; or if the next slot is 1 (namely, a sleep slot), the low power consumption state machine module continues to set the timer.

Certainly, as shown in ⑧ in FIG. 8, when the scenario identification module receives an application layer indication that the emergency service needs to be sent, the scenario identification module notifies the dynamic scheduling module. As shown in @ in FIG. 8, the dynamic scheduling module parses an emergency service packet, determines an address of a receiving end, and queries a busy/idle status of the receiving end from the low power consumption state machine module. The low power consumption state machine module notifies the dynamic scheduling module of the busy/idle status of the receiving end. The dynamic scheduling module determines a recently available slot based on the busy/idle status of the receiving end. Then, the dynamic scheduling module notifies the low power consumption state machine module of the recently available slot, and the low power consumption state machine module may modify the sleep and wake-up scheduling table based on received information about the recently available slot, and the low power consumption state machine module marks the slot as being used for negotiation of the emergency service packet.

Any device in the distributed system may update own sleep and wake-up status in the sleep and wake-up scheduling table based on sleep and wake-up time of another device. Each device selects, based on the sleep and wake-up scheduling table, another appropriate device at appropriate time to cooperatively perform the distributed service. This avoids unnecessary wake-up, and reduces power consumption.

For ease of understanding, in the following embodiments of this application, the sleep scheduling method provided in embodiments of this application is specifically described with reference to the accompanying drawings by using the electronic device 700 having the structure shown in FIG. 7A as an example.

Embodiments of this application provide a plurality of devices. The plurality of devices may be same devices, for example, the electronic devices 300, or the plurality of devices may be different devices, for example, some of the plurality of devices are the electronic devices 300, and some of the plurality of devices are displays. Implementation forms of the plurality of devices are not limited in embodiments of this application. For example, all the plurality of devices may be electronic devices, or the plurality of devices may be chips in the electronic device, or some of the plurality of devices are electronic devices, and some of the devices are chips in the electronic device.

Embodiments of this application further correspondingly provide a distributed system. The distributed system may include at least two of the plurality of devices. Certainly, the distributed system may further include another device. Multi-screen collaboration, information sharing, and the like may be performed between any devices in the distributed system. In embodiments of this application, the plurality of interconnected devices may form the system shown in FIG. 4, or may form the system shown in FIG. 5.

The technical solutions provided in embodiments of this application are described below in detail with reference to the accompanying drawings. In the following description process, an example in which the method is applied to the network architecture shown in FIG. 4 or FIG. 5 is used. It should be understood that, in a case in which a plurality of devices are interconnected, if there is a service between the plurality of devices, for example, a first device projects a file to a plurality of devices or the devices share a file, but not all the devices in the system are required to operate, to reduce energy consumption of each device as much as possible, in embodiments of this application, each device may independently determine whether to sleep, so as to enter longer sleep as possible. This reduces energy consumption to a maximum extent.

In addition, in embodiments of this application, each device implements independent sleep and wake-up based on a same sleep scheduling period. For unified scheduling, a primary device in the system may be prioritized, that is, the primary device sets a sleep scheduling period, and other devices mainly use the sleep scheduling period set by the primary device. When a link is established in the system shown in FIG. 4, a role has been assigned to each device, a GO may be considered as a primary device, and a GC may be considered as a secondary device. However, in the system shown in FIG. 5, because the devices establish connections to each other through Bluetooth and Wi-Fi discovery, roles of the devices in the system are equivalent, that is, a primary device and a secondary device are not distinguished. Therefore, before the sleep scheduling method provided in embodiments of this application is described, how to select a primary device in the system shown in FIG. 5 is first described.

In a possible implementation, priorities of the plurality of devices in the distributed system may be ranked, and a device with a highest priority is used as the primary device.

If a set of all the devices in the distributed system is referred to as a domain, the device with the highest priority in the domain is the primary device. A manner of determining a priority is not limited in embodiments of this application.

In an example, a priority of a device may be determined based on one or more of a device type of each device, an endurance capability of the device, a hardware capability of the device, a protocol version used by the device, a quantity of devices connected to the device, and a MAC address of the device. The device type is, for example, a display, a PC, a tablet, a mobile phone, an IoT device, a smart speaker, or a wearable device. The endurance capability of the device is, for example, a remaining power level of the device, for example, a high power, a medium power, a medium-low power, or a low power. It should be noted that a quantity of levels of the remaining power levels is not limited in embodiments of this application, and each remaining power level may be predefined. For example, if remaining power is greater than or equal to 70% of total power, the remaining power level is the high power; if remaining power is greater than or equal to 50% of total power and less than 70% of the total power, the remaining power level is the medium power; if remaining power is greater than or equal to 30% of total power and less than 50% of the total power, the remaining power level is the medium-low power; or if remaining power is less than 30% of total power, the remaining power level is the low power. The hardware capability of the device is, for example, that the device uses a dual Wi-Fi chip or a single Wi-Fi chip. It should be noted that the device type, the endurance capability of the device, the hardware capability of the device, and the like are merely examples for description. Specific representation forms of the device type, the endurance capability of the device, and the hardware capability of the device are not limited in embodiments of this application.

In embodiments of this application, the priority of the device may be determined based on priority information of each device, for example, the device type, the endurance capability of the device, the hardware capability of the device, the protocol version used by the device, the quantity of devices connected to the device, and a priority of the MAC address of the device. That is, the priorities of the devices are preferentially determined based on the device type of each device. If it is determined, based on the device type of each device, that the priorities of the devices are consistent, the priorities of the devices may be determined based on the endurance capabilities of the devices, and so on, until the priority of each device is determined. For example, the following operations may be performed in sequence: (1) Compare the type of each device, where a device with a higher device type is the primary device; and if the type of each device is the same, continue (2). (2) Compare the endurance capability of each device, where a device with a higher endurance capability is the primary device; and if the endurance capability of each device is the same, continue (3). (3) Compare the hardware capability of each device, where a device with a higher hardware capability is the primary device; and if the hardware capability of each device is the same, continue (4). (4) Compare the protocol version of each device, where a device with a later version is the primary device; and if the protocol version of each device is the same, continue (5). (5) Compare a quantity of devices connected to each device, where a device with a largest quantity of connections is the primary device; and if the quantity of devices connected to each device is the same, continue (6). (6) Compare the MAC address of each device by bit, where a device with a highest MAC address is the primary device.

Each device may report a ranking priority (ranking priority, RP) value of the device, and the RP value may be used to indicate the priority information of each device. The RP value may occupy one field, or may occupy a plurality of fields. This is not limited in embodiments of this application. For example, content indicated by the RP value may occupy different bits in a same field; or content indicated by the RP value may occupy different fields.

For example, the RP value may include two parts. One part indicates a ranking level (ranking level), and the other part indicates the MAC address of the device. The ranking level may include a device level, the protocol version of the device, and the quantity of devices connected to the device. The device level further includes the device type, the endurance capability of the device, and the hardware capability of the device.

Figure 9:
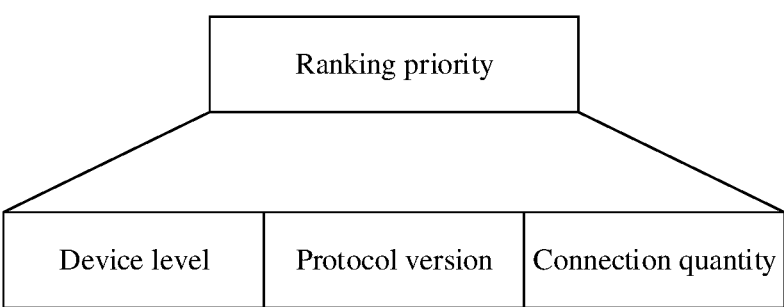
FIG. 9 is a schematic diagram of a structure of a frame that carries a first part of an RP value according to an embodiment of this application.

For example, FIG. 9 is a frame structure carrying the first part of the RP value. That is, a ranking level field includes three fields, and the three fields are a device level field, a protocol version field, and a connection quantity field. It should be noted that specific names of the three fields are not limited in embodiments of this application. A quantity of bits occupied by each field is not limited in embodiments of this application. For example, for a definition of the device level field, refer to Table 1.

TABLE 1

| Field | Type | Value |
|---|---|---|
| 5 to 7 bits | Device type | 6: display<br>5: PC<br>4: tablet<br>3: mobile phone<br>2: IoT device<br>1: speaker<br>0: wearable device |
| 2 to 4 bits | Endurance capability of the device | 3: high power (power is greater than or equal to 70%)<br>2: medium power (power is greater than or equal to 50% and less than 70%)<br>1: medium-low power (power is greater than or equal to 30% and less than 50%)<br>0: low power (power is less than 30%) |
| 0 to 1 bit | Hardware capability of the device | 1: dual Wi-Fi chip<br>0: single Wi-Fi chip |

After the primary device is selected in the distributed system, a secondary device may perform synchronization based on time of the primary device. A manner includes but is not limited to the following two manners.

For example, the primary device may periodically send a time synchronization frame, and the time synchronization frame may carry time information for time synchronization. For example, the time synchronization frame may be an 802.11 beacon frame, and carries time information of a timer synchronization function (timer synchronization function, TSF) and a basic service set identifier (basic service set identifier, BSSID) of the distributed system. Because the 802.11 beacon frame is used as the time synchronization frame, the TSF of the 802.11 beacon frame may be used. This can implement hardware clock synchronization at an error level of 10 μs, and shortens synchronization time between the devices as much as possible. Any secondary device receives the time synchronization frame from the primary device, and may obtain the BSSID carried in the time synchronization frame. If the obtained BSSID is the same as a BSSID of the secondary device, the secondary device may consider that the time synchronization frame is sent by the primary device located in a network, and implement synchronization with the primary device based on the time synchronization frame. For example, if determining that the obtained BSSID is the same as the BSSID of the secondary device, the secondary device may refresh a TSF counter, to implement time synchronization with the primary device.

Synchronization manner 2 is active time synchronization, that is, the secondary device actively applies for time synchronization. The secondary device actively applies for time synchronization, and does not need to wait for the primary device to send a time synchronization frame. The secondary device can complete synchronization with the primary device in advance. This reduces a synchronization delay.

For example, the secondary device that needs to apply for time synchronization is a first secondary device. The first secondary device may actively broadcast a time synchronization request message, for example, a sync_request action signaling frame, to request time synchronization with a device that has completed time synchronization in a same network. After receiving the time synchronization request message, the primary device or another secondary device may send a response message, for example, a sync_response action signaling frame, for the time synchronization request message to the first secondary device. The response message may carry TSF time information of the primary device or another secondary device and a social slot (social slot) location for sending information. The social slot location may be considered as a slot location for interaction when devices in a near field discover each other. After receiving the response message, the first secondary device may complete time pre-synchronization based on the TSF time information carried in the response message, that is, align with the TSF time information of the primary device. It should be understood that each device maintains TSF time information based on a local timer, but a delay exists in sending information by the device. Therefore, after the first secondary device receives the response message, the first secondary device may not discover the another secondary device in the network. Therefore, the first secondary device may further listen to, in a social slot, an action signaling frame from the primary device or another secondary device, so as to complete final synchronization based on time information carried in the action signaling frame.

After the primary device is determined, the primary device may set the sleep and wake-up period with N slots. Each slot may be considered as a time slice. A minimum unit of the time slice may be preset, for example, 16 ms, or another possible value. Each device in the system may choose to sleep or wake up in each slot in the sleep and wake-up period based on an actual requirement, for example, a connection status and a service status with another device. In embodiments of this application, a bitmap may be used to identify whether each slot is in a sleep state or a wake-up state.

Each device may broadcast sleep and wake-up information of the device. In this way, each device in the system knows a sleep and wake-up status of each other, and may select a device in a wake-up state to perform a distributed service, so that the plurality of devices sleep as much as possible, thereby reducing energy consumption. In the following description, for ease of differentiation, original basic sleep and wake-up information of each device is referred to as first sleep and wake-up information, and sleep and wake-up information regenerated by each device based on the service requirement is referred to as second sleep and wake-up information.

It should be understood that the method relates to the plurality of devices in FIG. 4 or FIG. 5. For ease of description, in the following description, an example in which the method relates to a first device and a plurality of devices, and the plurality of devices include, for example, a second device and a third device, or even a fourth device is used. The first device may be any device in FIG. 4 or FIG. 5, or the plurality of devices may be any device in FIG. 4 or FIG. 5. For any device, a process of updating the sleep and wake-up information of each device is the same. Therefore, in the following description process, that the first device updates sleep and wake-up information of the first device is used as an example. In the following description, an example in which N=32 and M=2 is used, that is, the sleep scheduling period includes 32 slots, and the announcement slots are first two slots in the 32 slots.

Figures 10, 11:
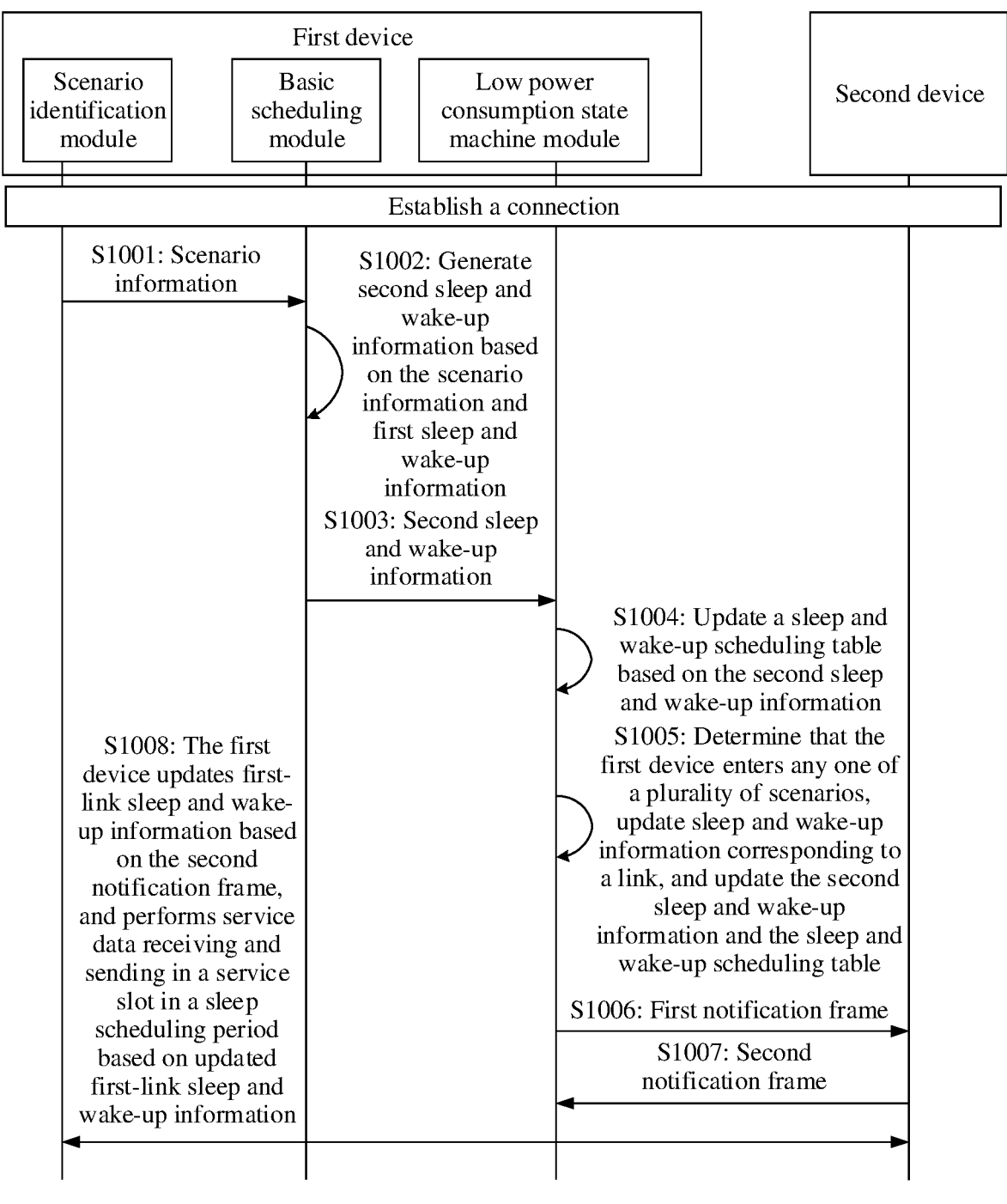
FIG. 10 is a schematic flowchart of a sleep scheduling method for a distributed system according to an embodiment of this application.
FIG. 11 is a schematic diagram of a structure of a PNF according to an embodiment of this application.

FIG. 10 is a schematic flowchart of a sleep scheduling method for a distributed system according to an embodiment of this application. For example, the method is performed by a first device.

S1001: A scenario identification module sends scenario information to a basic scheduling module, and correspondingly, the basic scheduling module receives the scenario information, where the scenario information indicates a service feature of a first service to be performed by the first device.

When the first service arrives, the first device may need to switch from a sleep state in some slots to a wake-up state. Therefore, if the first service arrives, an application at an application layer may notify the scenario identification module of the scenario information of the first service through an agreed interface. The scenario identification module receives the scenario information from the application layer, and may identify the scenario information, so as to determine a case in which the first service requires the first device to be woken up.

The scenario information may include peer MAC addresses, to notify the first device of a device or devices from which the first service comes. In addition, the scenario information may further include scenario-related information, for example, one or more of a packet transmission interval of the first service, a minimum delay tolerance value of the first service, and a number of frames transmitted per second (number of frames per second, fps), or other information for identifying the first service, for example, a service type, an audio type, a video type, or a file type. It should be understood that different scenario information corresponds to different sleep and wake-up statuses. For example, if the minimum delay tolerance value of the first service is low, the first device is in a wake-up state in each slot in a sleep scheduling period; or if the minimum tolerance value of the first service is high, the first device may be in a wake-up state in a part of time in a sleep scheduling period, and in a sleep state in some slots in the sleep scheduling period.

In some embodiments, the scenario information may also include information indicating the scenario-related information, for example, referred to as a scenario level. The scenario level may be set based on the scenario-related information. For example, if the minimum delay tolerance value of the first service is low, the scenario level is high; or if the minimum tolerance value of the first service is high, the scenario level is low. It should be understood that the scenario level may indicate a sleep and wake-up status of the first device in each time slice in the sleep scheduling period. In this embodiment of this application, a plurality of scenario levels may be predefined, and different scenario levels correspond to different sleep and wake-up statuses.

A specific implementation form of the scenario level is not limited in this embodiment of this application. In some embodiments, the scenario level may occupy a plurality of bits, or the scenario level may be defined based on a sleep and wake-up status of each slot in the sleep scheduling period.

For example, four scenario levels may be defined, for example, referred to as a first level, a second level, a third level, and a fourth level. For example, the scenario level may occupy two bits. For example, 00 identifies the first level, 01 identifies the second level, 10 identifies the third level, and 11 identifies the fourth level. For another example, the first level is "11111111111111111111111111111111", the second level is "10101010101010101010101010101010", the third level is "10000100001000010000100001000010", and the fourth level is "10000000000100000000001000000000", where "o" indicates sleep, and "1" indicates wake-up.

Certainly, in some embodiments, the scenario information may alternatively include the scenario level and the scenario-related information. This is not limited in this embodiment of this application.

S1002: The basic scheduling module generates second sleep and wake-up information based on the scenario information and first sleep and wake-up information, where the first sleep and wake-up information indicates a current sleep and wake-up status of the first device.

The basic scheduling module receives the scenario information, and may estimate a sleep and wake-up status of the first device based on the scenario information and a current service situation, namely, the first sleep and wake-up information, to determine a slot in which the first device needs to wake up. Generally, after the first device establishes a connection to another device, for example, a second device, a device link establishment module in the first device initializes the sleep and wake-up status of the first device. For example, the first device may be initialized to be in a wake-up state in each slot in the sleep scheduling period, to ensure normal running of various services as much as possible.

For example, in some embodiments, a structure of sleep and wake-up information of each link may be defined as follows:

```
Struct Timeinfo {
    U_int8* MacAddr;
    U_int8* AwakeDozeBitmap;
}
```

Timeinfo indicate sleep and wake-up information corresponding to the link, MacAddr is a peer address of the link, and AwakeDozeBitmap indicates the sleep and wake-up information corresponding to the link. When Timeinfo is initialized, for example, MacAddr may indicate a MAC address of the second device, and each bit in AwakeDozeBitmap is set to 1. Certainly, when a link established between the first device and the second device is disconnected, the device link establishment module may delete Timeinfo of the link between the first device and the second device, that is, release Timeinfo.

After initializing Timeinfo corresponding to the first device and the second device, the device link establishment module may send AwakeDozeBitmap to the basic scheduling module.

The basic scheduling module may generate the first sleep and wake-up information based on the scenario information. For example, the basic scheduling module may generate the first sleep and wake-up information according to a first preset rule and the scenario information. The first preset rule may meet:

(1) If the scenario information is empty, the current service condition of the first device is used, and the first sleep and wake-up information is generated based on the service condition.

(2) If the scenario information is not empty, the first sleep and wake-up information is generated based on the scenario information and the current service situation.

The basic scheduling module may obtain the scenario information, for example, the quantity of frames transmitted per second (frames per second, fps), and generate the first sleep and wake-up information based on the fps. It is agreed that an announcement slot is used as a start of each sleep scheduling period, and a first slot after the announcement slot is a slot in which a service can be sent. From the first slot in which the service can be sent, a quantity of slots for continuous sleep is $\lfloor$packet transmission interval/16$\rfloor$−1 (packet transmission interval=1000/fps). For example, if the scenario information indicates a scenario of 60 fps, a quantity of slots for continuous sleep is $\lfloor$1000/60/16$\rfloor$−1=0, that is, the first device should not sleep. For another example, if the scenario information indicates a scenario of 30 fps, a quantity of slots for continuous sleep is $\lfloor$1000/30/16$\rfloor$−1=1. Therefore, the first sleep and wake-up information corresponding to the link should be designed to one slot for wake-up and one slot for sleep. In this case, the first sleep and wake-up information, namely, AwakeDozeBitmap, is shown in Table 2.

generate the second sleep and wake-up information. It may be considered that the second sleep and wake-up information indicates a sleep and wake-up status that the first service needs to meet when the first device performs an original service and the first service.

For example, if the first device currently does not have a to-be-performed service, the first sleep and wake-up information may indicate that the first device is in a sleep state in each slot in the sleep scheduling period. If the scenario identification module detects that the first service arrives, for example, the scenario identification module receives the scenario (service) information from the application layer, the scenario identification module may identify the scenario information, and notify the basic scheduling module of an identification result. The basic scheduling module estimates, based on the received scenario information, the sleep and wake-up status of the first device to perform the first service, and generates the second sleep and wake-up information based on an estimation result and the first sleep and wake-up information.

The basic scheduling module may estimate, based on the received scenario information and a preset rule, the sleep and wake-up status of the first device to perform the first service.

In an example, the preset rule may meet one or more of the following:

(1) When the first device currently has no service, and the first service arrives, the basic scheduling module cannot determine the sleep and wake-up status of the first device to perform the first service, and the second sleep and wake-up information generated by the basic scheduling module indicates that the first device is in a wake-up state in each slot in the sleep scheduling period.

When the first device currently has no service, if the basic scheduling module determines that the first service arrives, for example, receives the scenario information, but cannot determine a specific scenario based on the scenario infor-

TABLE 2

| First sleep and wake-up information in the scenario of 30 fps | | | | | | | | | | | | | | | |
|---|---|---|---|---|---|---|---|---|---|---|---|---|---|---|---|
| 1 | 1 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 |

Likewise, if the scenario information indicates a scenario of 10 fps, a quantity of slots for continuous sleep is $\lfloor$1000/10/16$\rfloor$−1=5. Therefore, the first sleep and wake-up information corresponding to the link should be designed to one slot for wake-up and five slots for sleep. In this case, the first sleep and wake-up information, namely, AwakeDozeBitmap, is shown in Table 3. In Table 3, for example, it is also agreed that an announcement slot is a start of each sleep scheduling period, and a first slot after the announcement slot is a slot in which a service can be sent.

mation, for example, if the basic scheduling module cannot determine the minimum delay tolerance value, the scenario level, or the like of the first service, the basic scheduling module may set the first device to be in a wake-up state in each slot in the sleep scheduling period, to ensure smooth running of the first service.

(2) When the first device currently has a service, the first sleep and wake-up information indicates that the first device is in the wake-up state in each slot in the sleep scheduling

TABLE 3

| First sleep and wake-up information in the scenario of 10 fps | | | | | | | | | | | | | | | |
|---|---|---|---|---|---|---|---|---|---|---|---|---|---|---|---|
| 1 | 1 | 1 | 0 | 0 | 0 | 0 | 0 | 1 | 0 | 0 | 0 | 0 | 0 | 1 | 0 |
| 0 | 0 | 0 | 0 | 1 | 0 | 0 | 0 | 0 | 0 | 1 | 0 | 0 | 0 | 0 | 0 |

It should be understood that, when the first service arrives, the first device may need to switch from a sleep state in some slots to a wake-up state. Therefore, the first device needs to update the first sleep and wake-up information, that is, period, and the first service arrives, the second sleep and wake-up information generated by the basic scheduling module indicates that the first device is in the wake-up state in each slot in the sleep scheduling period.

Because the first device currently has the service, and the first sleep and wake-up information indicates that the first device is in the wake-up state in each slot in the sleep scheduling period, it may be considered that the first device needs to be always in the wake-up state to perform the current service. To avoid affecting the current service of the first device, the first device still keeps in the wake-up state even if the first service arrives.

(3) When the first device currently has a service, the first sleep and wake-up information indicates that the first device is in an wake-up state in some slots in the sleep scheduling period, and the first service arrives, if the basic scheduling module cannot determine the sleep and wake-up status of the first device to perform the first service, the second sleep and wake-up information generated by the basic scheduling module indicates that the first device is in the wake-up state in each slot in the sleep scheduling period; or if the basic scheduling module can determine the sleep and wake-up status of the first service to perform the first device, the basic scheduling module generates the second sleep and wake-up information based on the first sleep and wake-up information and the determined sleep and wake-up status of the first device to perform the first service, where the second sleep and wake-up information may indicate that the first device is in the wake-up state in some slots in the sleep scheduling period, so that the first device is in the sleep state as much as possible, thereby reducing power consumption.

In an example, the first sleep and wake-up information of the first device may be shown in Table 4.

TABLE 4

| | | | | | First sleep and wake-up information | | | | | | | | | | |
|---|---|---|---|---|---|---|---|---|---|---|---|---|---|---|---|
| 1 | 1 | 1 | 1 | 0 | 0 | 1 | 0 | 0 | 1 | 0 | 0 | 1 | 0 | 0 | 1 |
| 0 | 0 | 1 | 0 | 0 | 1 | 0 | 0 | 1 | 0 | 0 | 1 | 0 | 0 | 1 | 0 |

It is assumed that there is a second service, and sleep and wake-up information corresponding to the second service is, for example, shown in Table 5.

TABLE 5

| | | | | Sleep and wake-up information corresponding to the second service | | | | | | | | | | | |
|---|---|---|---|---|---|---|---|---|---|---|---|---|---|---|---|
| 1 | 1 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 |

Based on a first service requirement, the first device may update the first sleep and wake-up information, that is, regenerate sleep and wake-up information, namely, the second sleep and wake-up information, based on sleep and wake-up information corresponding to the first service and the first sleep and wake-up information. For example, the second sleep and wake-up information is shown in Table 6.

TABLE 6

| | | | | Second sleep and wake-up information | | | | | | | | | | | |
|---|---|---|---|---|---|---|---|---|---|---|---|---|---|---|---|
| 1 | 1 | 1 | 1 | 1 | 0 | 1 | 0 | 1 | 1 | 1 | 0 | 1 | 0 | 1 | 1 |
| 1 | 0 | 1 | 0 | 1 | 1 | 1 | 0 | 1 | 0 | 1 | 1 | 1 | 0 | 1 | 0 |

It can be seen from Table 4 to Table 6 that, when there is the service currently, if the basic scheduling module can determine a new service, the basic scheduling module may update the first sleep and wake-up information based on the new service, that is, generate the second sleep and wake-up information.

Certainly, if the first device completes some tasks, that is, some tasks end, the first device may also update the first sleep and wake-up information based on the preset rule, that is, generate the second sleep and wake-up information.

(4) When the first device currently has a service, the first sleep and wake-up information indicates that the first device is in the wake-up state in each slot in the sleep scheduling period, and the basic scheduling module receives an instruction for deleting the first service, if the basic scheduling module cannot determine a sleep and wake-up status that the first device needs to meet when performing a remaining service, the second sleep and wake-up information indicates that the first device is in the wake-up state in each slot in the sleep scheduling period; or if the basic scheduling module can determine a sleep and wake-up status that the first device needs to meet when performing a remaining service, the basic scheduling module generates the second sleep and wake-up information based on the first sleep and wake-up information and the determined sleep and wake-up status.

(5) When the first device currently has a service, the first sleep and wake-up information indicates that the first device is in the wake-up state in some slots in the sleep scheduling period, and the basic scheduling module receives an instruction for deleting the first service, the basic scheduling module generates the second sleep and wake-up information based on the first sleep and wake-up information and a sleep and wake-up status that the first device needs to meet when a remaining service is performed.

(6) The basic scheduling module receives a command for adjusting a service, and generates the second sleep and wake-up information based on the first sleep and wake-up information and a sleep and wake-up status that needs to be met by a service obtained after adjustment.

It should be understood that updating the first sleep and wake-up information of the first device is combining sleep and wake-up information of all links of the first device. For each slot, if a state corresponding to any link in the slot is "1", a state in the slot in the second sleep and wake-up information is still "1"; and only when states corresponding to all links in the slot are "0", states in the slot in the second sleep and wake-up information are "0".

S1003: The basic scheduling module sends the second sleep and wake-up information to a low power consumption state machine module, and correspondingly, the low power consumption state machine module receives the second sleep and wake-up information.

S1004: The low power consumption state machine module updates a sleep and wake-up scheduling table based on the second sleep and wake-up information.

The basic scheduling module may notify the low power consumption state machine module of a latest sleep and wake-up status of the device, namely, the second sleep and wake-up information. The low power consumption state machine module updates the latest sleep and wake-up information of the device to the sleep and wake-up scheduling table. Because the sleep and wake-up scheduling table may be used to schedule all devices in the distributed system, when a sleep and wake-up status of a device is updated, the low power consumption state machine module may update an updated sleep and wake-up status of the device to the sleep and wake-up scheduling table. In this way, the first device can select, based on the sleep and wake-up scheduling table, an appropriate device to perform a distributed service.

For example, when a sleep and wake-up status of any device changes, a frame processing module broadcasts a PNF in an announcement slot in a next sleep scheduling period, so as to notify each other of sleep and wake-up information corresponding to each other. The first device is used as an example. The PNF indicates a sleep and wake-up status of the first device in each slot in the sleep scheduling period, and may be considered as a private broadcast action frame. In addition to the sleep and wake-up information of the first device in each slot in the sleep scheduling period, the PNF may further include other information, for example, a MAC address of the first device, information for identifying a type of the PNF, and a quantity of devices connected to the first device.

In an example, FIG. 11 is a schematic diagram of a structure of the PNF according to this embodiment of this application. The PNF may include a plurality of fields, such as a MAC header (header) field, a code (code) field, an organizationally unique identifier (organizationally unique identifier, OUI) field, an OUI type (type) field, an action type (action type) field, one or more attribute fields, a connection quantity field, and a frame check sequence (frame check sequence, FCS). It should be noted that FIG. 11 is merely an example. The PNF may include more or fewer fields, and each field may occupy one or more bits. This is not limited in this embodiment of this application.

The MAC header field may be determined based on a MAC header of an action frame, for example, may carry a MAC address (also referred to as a source address, namely, the PNF is of the first device) and a destination address of the first device. Because the first device broadcasts the PNF, the destination address is a broadcast destination address. The code field may be filled based on a category code (category code) of the action frame, for example, may be determined as 127 based on the 802.11 protocol, that is, indicates a vendor-specific action. The OUI field may be predefined. For example, the OUI field may carry "0x00-E0-FC", to indicate that the PNF is a private frame. The OUI type field identifies an OUI type, for example, a private frame related to the PNF provided in this embodiment of this application. The action type field identifies an action frame type. For example, a frame type of the PNF may be "0x01".

The one or more attribute fields at least carry the sleep and wake-up information of the first device. The connection quantity field carries a quantity of devices connected to the first device.

It should be understood that in S1001, only the first device is used as an example. Actually, each device in the distributed system broadcasts a PNF in the announcement slot in the sleep scheduling period. In this way, the sleep and wake-up scheduling table can be generated based on sleep and wake-up information of each device. For example, the frame processing module in the first device may also parse a PNF received from another device, and send a parsing result to the low power consumption state machine module, so that the low power consumption state machine module updates, based on the PNF sent by the another device in the announcement slot, the sleep and wake-up scheduling table stored in the low power consumption state machine module. For example, a sleep and wake-up scheduling table carries identifier information uniquely identifying a device, for example, a MAC address or an ID. After updating the sleep and wake-up scheduling table, the low power consumption state machine module may broadcast a PNF frame in a next announcement slot, to establish a connection between devices or transmit information. It should be understood that a sleep scheduling period is defined for a primary device in the distributed system, and a low power consumption timer module in each device in the system sets a timer for setting a start of the sleep scheduling period and a start of sleep and wake-up time. When the service arrives, the low power consumption state machine module may update the sleep and wake-up status corresponding to the low power consumption state machine module, so that the service can be normally performed. In addition, the low power consumption state machine module may update an updated sleep and wake-up status to the stored sleep and wake-up scheduling table, and notify another device of an updated sleep and wake-up status, so that the another device updates a stored sleep and wake-up scheduling table, and the system uses a unified sleep and wake-up scheduling table to perform sleep scheduling.

The first device may perform the first service based on the updated sleep and wake-up scheduling table. It should be understood that in a possible scenario, the first device may need to re-estimate a sleep and wake-up status of the first device. The following lists several scenarios in which the first device needs to update the sleep and wake-up information of the first device and the stored sleep and wake-up scheduling table.

Scenario 1 may also be referred to as a link change scenario.

For any link of the first device, service traffic on the link may change, and a current sleep and wake-up status of the first device may not be optimal. For example, if service data of a specific link of the first device increases, that is, traffic increases, a data cache module in the first device stores a large volume of service data. To transmit the service data stored in the data cache module to a peer device more quickly, a wake-up slot may be temporarily added. For another example, service traffic decreases in a period of time. In this case, the first device can enter sleep more, to reduce power consumption as much as possible. Based on this, before updating the sleep and wake-up scheduling table in the announcement slot in each sleep scheduling period, that is, before sending the PNF, the low power consumption state machine module in the first device may first adaptively adjust the sleep and wake-up scheduling table based on a traffic volume of each link of the first device. For example, when traffic on a link between the first device and a second device exceeds a specific threshold, the low power consumption state machine module may temporarily add a wake-up slot, that is, the sleep and wake-up information of the first device may indicate more wake-up states. Certainly, a link of the first device may have a burst emergency service. In this case, a wake-up slot may also be temporarily added. It should be noted that traffic statistics collection on the link between the first device and the second device may be implemented in a bottom layer, that is, traffic listening and statistics collection are performed in the bottom layer, or statistics collection may be performed based on service-related information delivered by a service flow upper layer. This is not limited in this embodiment of this application.

Certainly, to ensure normal running of a service, sleep and wake-up information of any link of the first device changes, and the first device needs to notify the peer device (for example, the second device) of the corresponding link of changed sleep and wake-up information. For example, the transmission link between the first device and the second device is a first link. When the sleep and wake-up information corresponding to the first link of the first device changes, the first device may update the sleep and wake-up information corresponding to the first link, and notify the second device of updated sleep and wake-up information corresponding to the first link. The second device may update stored sleep and wake-up information corresponding to the first link based on the updated sleep and wake-up information, corresponding to the first link, from the first device. The second device may notify the first device of updated sleep and wake-up information corresponding to the first link, and the first device updates the sleep and wake-up information corresponding to the first link again based on the updated sleep and wake-up information. In this way, the sleep and wake-up information corresponding to the first link stored by the first device is consistent with that stored by the second device, so as to ensure normal service running.

It should be understood that the sleep and wake-up information of the first device needs to meet sleep and wake-up information of each link of the first device. The first device may store sleep and wake-up information of each link of the first device. When the sleep and wake-up information of any link of the first device changes, the sleep and wake-up information of the first device needs to be updated, and the updated sleep and wake-up information is updated to the sleep and wake-up scheduling table stored in the first device.

Scenario 2 is also referred to as an emergency service scenario.

An emergency service may be considered as a service that needs to be processed first. When there is an emergency service request from a second device, or the first device needs to send the emergency service to the second device, a current sleep and wake-up status of the first device may not be optimal. In this case, the first device may temporarily add a wake-up slot, to receive or send the emergency services. It should be understood that the first device needs to notify the second device that the wake-up slot is temporarily added, to ensure that the emergency service can be normally performed between the first device and the second device.

In some embodiments, the first device and the second device may negotiate a sleep and wake-up status for sending the emergency service, and update sleep and wake-up information corresponding to a link (for example, a first link) between the first device and the second device. A specific solution in which the first device and the second device negotiate the sleep and wake-up status for sending the emergency service is described below. Certainly, the first device may update the sleep and wake-up information of the first device and the stored sleep and wake-up scheduling table based on sleep and wake-up information, corresponding to a transmission link, that is finally updated by the first device.

Scenario 3 is also referred to as a keepalive scenario. That is, links between interconnected devices keep in a connected state, and there is no service data interaction between the interconnected devices. In this scenario, although there is no service data interaction between the interconnected devices, the links between the interconnected devices keep in a connected state. In this way, a part of data can be maintained between the devices, for example, interaction of small-traffic and delay-insensitive data, which does not affect normal operation of the devices. Therefore, in the keepalive scenario, interaction of small-traffic and delay-insensitive data can be related. Naturally, the first device also updates the sleep and wake-up information of the first device and the stored sleep and wake-up scheduling table. For example, due to factors such as interference, the first device does not send the service data in time, but stores the service data in the data cache module. If the data cache module stores a large volume of data, utilization of storage space of the first device is reduced. Therefore, in the keepalive scenario, the data cache module may have service data that is not totally transmitted before. Before updating the sleep and wake-up scheduling table in the announcement slot in each sleep scheduling period, the low power consumption state machine module in the first device may first query a data volume stored in the data cache module. If the data volume is greater than or equal to a preset threshold, the low power consumption state machine module may temporarily add a wake-up slot, so as to send the data stored in the data cache module as soon as possible. In this scenario, sleep and wake-up slots corresponding to the link of the first device also change, and therefore the first device needs to notify the peer device of the change of the sleep and wake-up status corresponding to the link. In addition, the first device needs to update the sleep and wake-up information of the first device, and update updated sleep and wake-up information to the sleep and wake-up scheduling table stored in the first device.

It should be noted that the basic scheduling module may also start to detect, in each slot, the volume of the data stored in the data cache module. Once it is determined that the volume of the data is greater than or equal to the preset threshold, the low power consumption state machine module updates the sleep and wake-up information of the first device and the sleep and wake-up scheduling table.

Scenario 4 is also referred to as a service change scenario.

It should be understood that a service of the first device may change. For example, the first service ends the first service, a second service is added to the first device, the first service of the first device changes to a second service, or the first device deletes a previously performed service. In this case, the first device needs to re-estimate the sleep and wake-up status of the first device, that is, the first device may adaptively add a wake-up slot or reduce a wake-up slot based on a service change status. For example, if the first device ends the first service, the first device may temporarily reduce a wake-up slot. For another example, if the second service is added to the first device, the first device may temporarily add a wake-up slot. Therefore, before updating the sleep and wake-up scheduling table in the announcement slot in each sleep scheduling period, the low power consumption state machine module in the first device may first determine whether the service changes, and if the service changes, the low power consumption state machine module may adjust sleep and wake-up information corresponding to a link of the first device, and update sleep and wake-up information and a sleep and wake-up scheduling table based on, sleep and wake-up information, corresponding to the corresponding link, obtained after adjustment.

It should be understood that, in any one of Scenario 1 and Scenario 4, the first device updates the sleep and wake-up information and the sleep and wake-up scheduling table. In addition, the first device further needs to notify the peer device of the latest sleep and wake-up information of the first device. For example, when sleep and wake-up information of any link changes, sleep and wake-up information needs to be regenerated and stored. To keep devices at both ends of a link sleep and wake-up consistently in sleep and wake-up information based on the link, one end of the link may notify updated sleep and wake-up information to the frame processing module, and the frame processing module notifies the link peer end of new sleep and wake-up information in a notification frame in an announcement slot.

It may be understood that, after generating the second sleep and wake-up information and updating the sleep and wake-up scheduling table, the first device may further flexibly adjust sleep and wake-up information corresponding to a link of the first device based on an actual application scenario, and update the sleep and wake-up information and the sleep and wake-up scheduling table of the first device based on the sleep and wake-up information corresponding to the corresponding link, so that the first device enters sleep more without affecting various services performed by the first device, thereby reducing power consumption.

The following separately uses a plurality of scenarios as an example, and uses an example in which the peer device of the first device is the second device to describe how the first device updates link-level sleep and wake-up information, and an occasion for updating the sleep and wake-up information of the first device and the stored sleep and wake-up scheduling table. It should be understood that the first device may listen to whether to enter any one of the foregoing four scenarios; and if entering a scenario, adaptively adjust sleep and wake-up information corresponding to a link of the first device based on an actual requirement of the scenario. For ease of description, the link-level sleep and wake-up information is referred to as link sleep and wake-up information below. For a transmission link between the first device and the second device, when a scenario occurs, the first device adjusts sleep and wake-up information corresponding to the transmission link. Sleep and wake-up information, corresponding to the transmission link, obtained after adjustment of the first device may be referred to as first-link sleep and wake-up information, and sleep and wake-up information, corresponding to the transmission link, obtained after update of the second device may be referred to as second-link sleep and wake-up information.

S1005: The low power consumption state machine module determines that the first device enters the any one of the plurality of scenarios, updates the sleep and wake-up information corresponding to the corresponding link, and updates the sleep and wake-up information and the sleep and wake-up scheduling table of the first device.

For ease of understanding, the following describes a specific procedure of the sleep scheduling method provided in this embodiment of this application in the keepalive scenario and the emergency service after a normal service.

Figure 12:
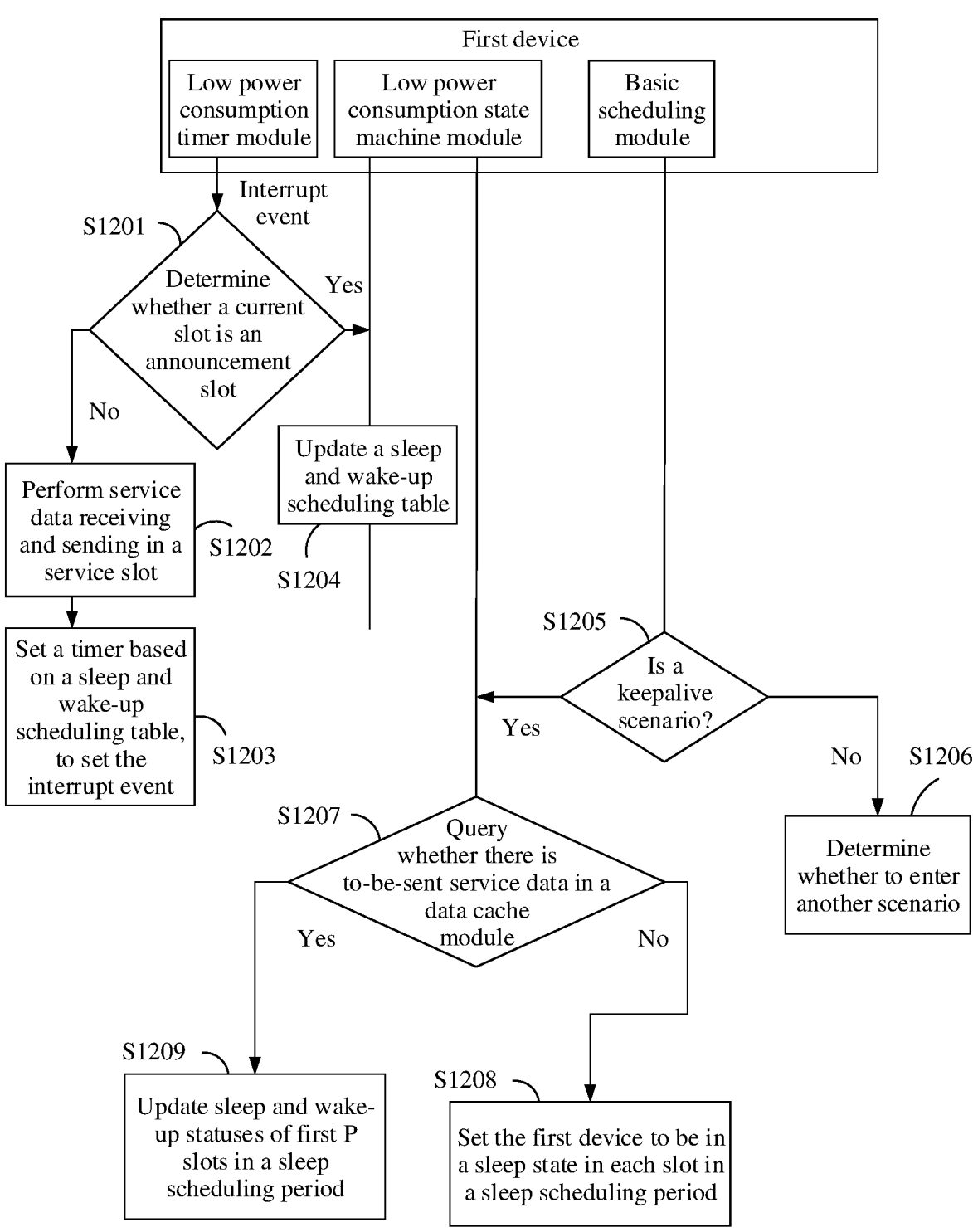
FIG. 12 is a schematic flowchart of an example of a sleep scheduling method according to an embodiment of this application.

For example, FIG. 12 is a schematic flowchart of the sleep scheduling method in the keepalive scenario according to this embodiment of this application. For example, in FIG. 12, the method is performed by the first device.

S1201: When an interrupt event arrives, the low power consumption timer determines whether a current slot is an announcement slot.

The interrupt event may be set. For example, a time slice arrival event is used to trigger the power consumption timer to throw a time slice event to the low power consumption state machine module. After receiving the event, the low power consumption state machine module sets a timer and determines whether the current slot is the announcement slot. If the current slot is not the announcement slot, S1202 and S1203 may be performed; or if the current slot is the announcement slot, S1204 and steps after S1204 may be performed.

S1202: Perform service data receiving and sending in a service slot.

S1203: Set the timer based on a sleep and wake-up scheduling table, to set the interrupt event.

It should be understood that, if the current slot is the service slot, service data receiving and sending are performed in a slot in a wake-up state based on the current sleep and wake-up scheduling table. Then, the timer may be set based on the sleep and wake-up scheduling table, and the interrupt event may be set, so as to continue sleep scheduling in a next sleep scheduling period.

S1204: If the current slot is the announcement slot, the low power consumption state machine module updates a sleep and wake-up scheduling table.

If the current slot is the announcement slot, the low power consumption state machine module may update the stored sleep and wake-up scheduling table based on sleep and wake-up information indicated by a PNF frame from each device.

S1205: The basic scheduling module determines whether a scenario is the keepalive scenario.

It should be understood that, if a service arrives, the scenario identification module may identify the service, generate scenario information, and send the scenario information to the basic scheduling module. The basic scheduling module determines, based on the received scenario information, whether the service has data to be received or sent, that is, determines whether there is a new service. For specific implementation of the scenario information, refer to the related content description in S1001. Details are not described herein again. If the scenario information indicates that there is the service, the basic scheduling module generates second sleep and wake-up information based on the scenario information and current first sleep and wake-up information.

Then, if any one of Scenario 1 to Scenario 4 occurs, the low power consumption state machine module in the first device updates the second sleep and wake-up information and the stored sleep and wake-up scheduling table.

S1206: If it is determined that the scenario is not the keepalive scenario, determine whether to enter another scenario.

S1207: If it is determined that the scenario is the keepalive scenario, query whether there is to-be-sent service data in the data cache module.

S1208: If there is no to-be-sent service data in the data cache module, the low power consumption state machine module may set the first device to be in a sleep state in each slot in the sleep scheduling period.

S1209: If there is to-be-sent service data in the data cache module, the low power consumption state machine module may update sleep and wake-up statuses of first P slots in the sleep scheduling period, and update the sleep and wake-up scheduling table, where P is a positive integer, P is as small as possible, and the P slots are consecutive slots, that is, the low power consumption state machine module updates sleep and wake-up information of P consecutive slots as close as possible to the announcement slot.

In the keepalive scenario, the data cache module may have service data that is not totally transmitted before. In this case, whether there is to-be-sent service data in the data cache module may be queried. If there is to-be-sent service data in the data cache module, to complete sending of the service data in the data cache module as soon as possible, the service data may be sent in an available slot in the sleep scheduling period. Preferably, the first P consecutive available slots in the sleep scheduling period may be selected to send the service data, thereby improving data transmission efficiency. For example, the P consecutive slots are set to a wake-up state. After updating the sleep and wake-up information, the low power consumption state machine module may update updated sleep and wake-up information to the stored sleep and wake-up scheduling table, and broadcast the updated sleep and wake-up information in the announcement slot. It is considered that when a data volume of the service data in the data cache module is small, subsequent link transmission efficiency is not greatly affected. In this case, to reduce power consumption of the first device as much as possible, the sleep and wake-up information of the P slots does not need to be adjusted. In other words, if there is to-be-sent service data in the data cache module, and the data volume of the service data is greater than a preset threshold, the low power consumption state machine module may update the sleep and wake-up information of the P slots. Certainly, if there is no to-be-sent service data in the data cache module, the first device may be set to stay sleep in the sleep scheduling period, thereby reducing power consumption. It is considered that the data volume in the data cache module may be large or may be small. If the data volume in the data cache module is small, and the P slots are set to the wake-up state, power consumption is high. Therefore, in some embodiments, when determining that there is to-be-sent service data in the data cache module, the low power consumption state machine module may also adjust current sleep and wake-up information from one low power consumption range to another low power consumption range. For example, if a current low power consumption range is a sixth range, the power consumption range may be adjusted from the sixth range to a fourth range or another range. A specific range to which the current low power consumption range is adjusted may be predefined, for example, two low power consumption ranges are increased. Alternatively, a range to which the current low power consumption range is adjusted may be determined based on a listened link traffic volume, so as to improve data transmission efficiency as much as possible and reduce power consumption of the first device as much as possible.

It should be understood that, after updating the sleep and wake-up statuses of the first P slots in the sleep scheduling period, the first device may notify, in the announcement slot, the another device in the system of updated sleep and wake-up statuses, and the another device updates, based on latest sleep and wake-up information from the first device, a sleep and wake-up scheduling table stored by the another device. In this way, sleep and wake-up scheduling tables of all devices in the entire system are consistent, to ensure that services are normally performed between the devices, and when the devices normally perform services, the devices can enter sleep as much as possible, thereby reducing power consumption as possible.

Figure 13:
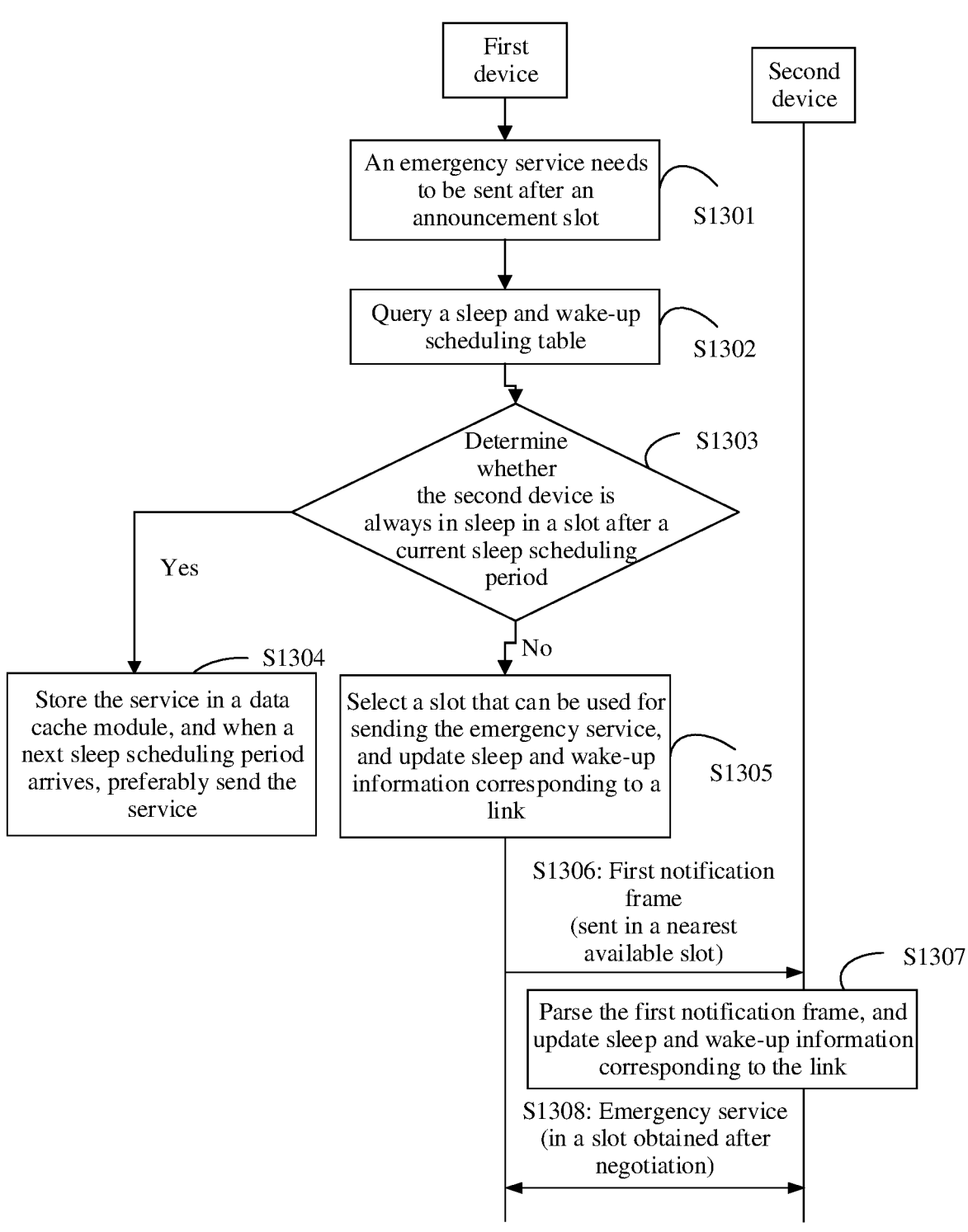
FIG. 13 is a schematic flowchart of processing an emergency service according to an embodiment of this application.

FIG. 13 is a schematic flowchart of processing the emergency service. When there is the emergency service, for example, the first device needs to send the emergency service to the second device, or the second device needs to send the emergency service to the first device, the first device and the second device need to negotiate, based on the emergency service, a slot for the emergency service, and update sleep and wake-up information of the first device and the second device and stored sleep and wake-up scheduling tables. For ease of understanding, the following describes how to update sleep and wake-up information corresponding to a link when there is the emergency service from the second device.

S1301: The first device determines that the emergency service needs to be sent after an announcement slot.

S1302: The first device queries a sleep and wake-up scheduling table.

S1303: The first device determines whether the second device is always in sleep in a slot after a current sleep scheduling period.

It should be understood that a sleep and wake scheduling table stored by the first device includes sleep and wake-up information of the second device, so as to determine whether the second device is always in sleep in the slot after the current sleep scheduling period based on the sleep and wake-up information of the second device.

S1304: If the second device is always in sleep in the slot after the current sleep scheduling period, the first device stores received emergency service data in the data cache module, and preferentially sends the emergency service data when a next sleep scheduling period arrives.

When the next sleep scheduling period arrives, when the emergency service data is preferentially sent, the first device and the second device negotiate the slot for the emergency service in the announcement slot, and then perform emergency service receiving and sending in the slot obtained after negotiation.

S1305: If the second device is not always in sleep in the slot after the current sleep scheduling period, the first device may select the slot that can be used to send the emergency service, and update the sleep and wake-up information of the first device.

S13o6: The first device sends a first notification frame to the second device, and correspondingly, the second device receives the first notification frame.

After selecting the slot that can be used to send the emergency service, the first device may notify the second device that the first device is to send emergency service data. The first notification frame may be sent in a wake-up slot of the second device, for example, may be sent in a nearest slot available to the second device. The first notification frame includes information such as identity information of the first device and the slot that is selected by the first device and that can be used to send the emergency service (namely, the first-link sleep and wake-up information).

S1307: The second device parses the first notification frame, and updates the sleep and wake-up information corresponding to the corresponding link.

After receiving the first notification frame, the second device may parse the first notification frame, and obtain the first-link sleep and wake-up information from the first notification frame, that is, information such as a quantity of slots used by the first device to send the emergency service to the second device. The second device may set, based on the first-link sleep and wake-up information, slots whose quantity is same as that of slots for sending the emergency service to a wake-up state, obtain the second-link sleep and wake-up information, and update the stored sleep and wake-up scheduling table. After obtaining the second-link sleep and wake-up information, the second device may notify, by using a reply frame of the first notification frame, namely, a second notification frame, the first device of the second-link sleep and wake-up information, and the first device learns of the slot for starting transmitting the emergency service.

S1308: The first device and the second device perform emergency service receiving and sending in the slot obtained after negotiation.

Figures 14, 15:
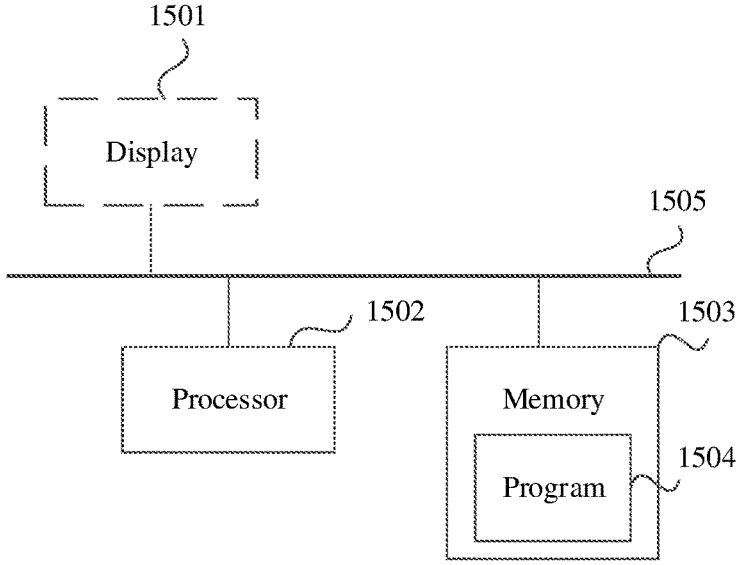
FIG. 14 is a schematic diagram of a structure of a dynamic negotiation frame according to an embodiment of this application.
FIG. 15 is a schematic diagram of another structure of an electronic device according to an embodiment of this application.

For ease of understanding, the following describes the procedures shown in FIG. 13 and FIG. 14 by using specific examples.

It is assumed that there is a device A, a device B, and a device C. The device A initiates a projection service to the device B, for example, a distributed video stream of 30 fps. The device A also initiates a projection service to the device C, for example, a distributed gallery of 10 fps.

A sleep and wake-up status corresponding to the distributed video stream of 30 fps is, for example, shown in Table 7, that is, sleep and wake-up information of the device B in a sleep and wake-up scheduling table is as follows:

TABLE 7

| | | | | | | | | | | | | | | | |
|---|---|---|---|---|---|---|---|---|---|---|---|---|---|---|---|
| 1 | 1 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 |

A sleep and wake-up status corresponding to the distributed gallery of 10 fps is, for example, shown in Table 8, that is, sleep and wake-up information of the device C in a sleep and wake-up scheduling table is as follows:

TABLE 8

| | | | | | | | | | | | | | | | |
|---|---|---|---|---|---|---|---|---|---|---|---|---|---|---|---|
| 1 | 1 | 1 | 0 | 0 | 0 | 1 | 0 | 0 | 0 | 0 | 0 | 1 | 0 | 0 | 0 |
| 0 | 0 | 1 | 0 | 0 | 0 | 0 | 0 | 1 | 0 | 0 | 0 | 0 | 0 | 1 | 0 |

In this case, the device A may generate, based on Table 7 and Table 8, sleep and wake-up information shown in Table 9, that is, sleep and wake-up information of the device A in a sleep and wake-up scheduling table is as follows:

TABLE 9

| | | | | | | | | | | | | | | | |
|---|---|---|---|---|---|---|---|---|---|---|---|---|---|---|---|
| 1 | 1 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 |

After generating new sleep and wake-up information based on a service requirement of the device A, the device B, or the device C, any device of the device A, the device B, or the device C may broadcast the sleep and wake-up information of the device in an announcement slot in a sleep scheduling period, and update the latest sleep and wake-up information to the sleep and wake-up scheduling table. The device A, the device B, or the device C may sleep and wake up based on the sleep and wake-up information of the device in the sleep and wake-up scheduling table. The device A is used as an example, as shown in Table 9, the device A wakes up in a first slot, sleeps in a second slot, wakes up in a third slot, and so on. However, if a device D is added to a system at this time, but there is no service between the device A and the device D, there may be a service between the device D and another device. As the device D joins, the sleep and wake-up information of the device A needs to be updated. It is assumed that sleep and wake-up information of the device D is, for example, shown in Table 10.

TABLE 10

| | | | | | | | | | | | | | | | |
|---|---|---|---|---|---|---|---|---|---|---|---|---|---|---|---|
| 1 | 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

The device A updates the sleep and wake-up information of the device based on the sleep and wake-up information of the device D, and updated sleep and wake-up information is, for example, shown in Table 11.

TABLE 11

| | | | | | | | | | | | | | | | |
|---|---|---|---|---|---|---|---|---|---|---|---|---|---|---|---|
| 1 | 1 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 |

If an emergency service exists between the device A and the device C and is to be sent from the device A to the device C. It is assumed that the emergency service arrives in an eleventh slot, and the emergency service requires four slots. In this case, the device A may notify the device C to adjust the sleep and wake-up information based on the emergency service. It can be seen from Table 8 that, after the emergency service arrives, a nearest wake-up slot is a thirteenth slot. However, it can be seen from Table 11 that the device A is also in a wake-up state in a thirteenth slot, and the device A and the device C may negotiate, in the thirteenth slot, an available slot for the emergency service. That is, the device A may send a third notification frame to the device C in the thirteenth slot, and after receiving the first notification frame, the device C updates the sleep and wake-up information based on the emergency service. For example, if the device C determines that the emergency service requires the four slots, the device C may set four consecutive slots to the wake-up state starting from the thirteenth slot, that is, set a fourteenth slot to a seventeenth slot to the wake-up state. The device C may notify the device A of updated sleep and wake-up information, that is, the device C sends a second notification frame to the device A. The device A receives the second notification frame, and may also set a fourteenth slot to a seventeenth slot to the wake-up state. The device C and the device A separately update the sleep and wake-up information and sleep and wake-up scheduling tables based on a negotiation result. Updated sleep and wake-up information of the device C is, for example, shown in Table 12, and updated sleep and wake-up information of the device A is, for example, shown in Table 13.

TABLE 12

| | | | | | | | | | | | | | | | |
|---|---|---|---|---|---|---|---|---|---|---|---|---|---|---|---|
| 1 | 1 | 0 | 0 | 0 | 0 | 1 | 0 | 0 | 0 | 0 | 0 | 1 | 1 | 1 | 1 |
| 1 | 0 | 1 | 0 | 0 | 0 | 0 | 0 | 1 | 0 | 0 | 0 | 0 | 0 | 1 | 0 |

TABLE 13

| | | | | | | | | | | | | | | | |
|---|---|---|---|---|---|---|---|---|---|---|---|---|---|---|---|
| 1 | 1 | 1 | 0 | 1 | 0 | 1 | 0 | 1 | 0 | 1 | 0 | 1 | 1 | 1 | 1 |
| 1 | 0 | 1 | 0 | 1 | 0 | 1 | 0 | 1 | 0 | 1 | 0 | 1 | 0 | 1 | 0 |

The device A may sleep and wake up based on Table 13, and the device C may sleep and wake up based on Table 12, to implement emergency service receiving and sending. It should be noted that, in Table 8, the device C is in the wake-up state in the thirteenth slot, and in Table 11, the device A is in the wake-up state in the thirteenth slot, and both are merely examples. In some embodiments, even if the device A is in a sleep state in the thirteenth slot, the device A may first wake up in the thirteenth slot, and then send the first notification frame to the device C.

After adjusting the sleep and wake-up information corresponding to the link based on the actual scenario, the first device may notify the second device of sleep and wake-up information, corresponding to the link, obtained after adjustment.

S1006: The low power consumption state machine module sends the first notification frame to the second device, and correspondingly, the second device receives the first notification frame, where the first notification frame carries the first-link sleep and wake-up information.

S1007: The low power consumption state machine module receives the second notification frame from the second device, where the second notification frame carries the second-link sleep and wake-up information.

After the first device performs the first service, the low power consumption state module may determine whether the first device enters any one of the foregoing four scenarios. If determining that the first device enters a scenario, the low power consumption state module updates the sleep and wake-up information corresponding to the link of the first device, to obtain the first-link sleep and wake-up information. The first device further needs to notify the second device of the first-link sleep and wake-up information, so that the second device adaptively updates the stored sleep and wake-up information corresponding to the link.

Scenario 1 is used as an example. When traffic on the transmission link between the first device and the second device increases, it may be considered that the data cache module in the first device stores a large volume of service data. To transmit the service data stored in the data cache module to the second device quickly, a wake-up slot may be temporarily added. That is, the first device may flexibly adjust the sleep and wake-up information corresponding to the transmission link, to obtain the first-link sleep and wake-up information. After obtaining the first-link sleep and wake-up information, the first device may send the first notification frame to the second device, where the first notification frame carries the first-link sleep and wake-up information. That is, the first device notifies the second device of the first-link sleep and wake-up information. The second device may update, based on the first-link sleep and wake-up information, sleep and wake-up information, corresponding to the transmission link, stored in the second device, to obtain the second-link sleep and wake-up information. For a specific implementation in which the second device updates, based on the first-link sleep and wake-up information, the stored sleep and wake-up information corresponding to the link, refer to the foregoing Table 3 to Table 5. Details are not described herein again. After obtaining the second-link sleep and wake-up information, the second device may notify the first device of the second-link sleep and wake-up information, so that the first device updates, based on the second-link sleep and wake-up information, the sleep and wake-up information corresponding to the link.

In some embodiments, the first notification frame may be sent in a wake-up slot of the second device. For example, if the second device is in a wake-up state in a fifth slot in the sleep scheduling period, the first device may send the first notification frame to the second device in the fifth slot. It should be noted that, if the first device and the second device each are in the wake-up state in the fifth slot, the first device may directly send the first notification frame to the second device in the fifth slot. If the first device is in a sleep state in the fifth slot, and the second device is in the wake-up state in the fifth slot, the first device may first wake up in the fifth slot, and then send the first notification frame to the second device in the fifth slot. It should be understood that, after receiving the first notification frame, the second device feeds back the second notification frame to the first device. If a delay is not large, the second notification frame may be sent in the fifth slot, or may be sent in another wake-up slot, for example, a sixth slot. It is considered that the second device may not receive the first notification frame due to factors such as interference, to ensure that sleep and wake-up information corresponding to a link between the first device and the second device is consistent, a timer may be set in this embodiment of this application. If the timer expires, and the first device has not received the second notification frame from the second device, it may be considered that the second device has not received the first notification frame, and the first device may resend a first notification frame to the second device.

Likewise, in Scenario 2, when there is the emergency service between the first device and the second device, the first device may also temporarily add a wake-up slot. That is, the first device needs to update the sleep and wake-up information corresponding to the transmission link between the first device and the second device Likewise, after updating the sleep and wake-up information corresponding to the transmission link, the first device needs to notify the second device. In Scenario 2, because there is the emergency service between the first device and the second device, to transmit data of the emergency service quickly, in an alternative implementation of the first notification frame, the first notification frame may also indicate the second device to start the emergency service. For example, the first device sends the first notification frame to the second device in a fifth slot of the second device. After receiving the first notification frame, the second device may wake up in all slots after the fifth slot, and the first device may also wake up in all slots after the fifth slot. In this way, the sleep and wake-up information corresponding to the link between the first device and the second device is also consistent. Certainly, when the emergency service ends, the first device may notify the second device. For example, the first device resends a first notification frame to the second device, to indicate to end the emergency service. After receiving the first notification frame, the second device may restore the sleep and wake-up information corresponding to the link to the sleep and wake-up information before the emergency service.

Scenario 3 and Scenario 4 are similar to Scenario 1 and Scenario 2, and the first device also needs to update the sleep and wake-up information corresponding to the link. Details are not described herein again. Certainly, after adjusting the sleep and wake-up information corresponding to any link, the low power consumption state machine module in the first device needs to adaptively update the sleep and wake-up information and the sleep and wake-up scheduling table of the first device. After updating the sleep and wake-up information of the first device, the first device may notify another device of the latest sleep and wake-up information of the first device. For example, the low power consumption state machine module may send the latest sleep and wake-up information of the first device to the frame processing module, and the frame processing module may generate the PNF based on the latest sleep and wake-up information of the first device, so as to broadcast the PNF in the announcement slot. It should be noted that the first notification frame and the second notification frame may be sent in the announcement slot in the sleep scheduling period, or may be sent in the service slot in the wake-up state in the sleep scheduling period.

In an example, FIG. 14 is a schematic diagram of a structure of the first notification frame or the second notification frame. The first notification frame is used as an example. The first notification frame may include, for example, a MAC header field, a code field, an OUI field, an OUI type field, an action type field, an attribute field, and an FCS field, where the attribute field carries the sleep and wake-up information of the first device. Similar to the PNF frame, for a specific function of each field of the first notification frame, refer to the description of the PNF. Details are not described herein again.

S1008: The first device updates the first-link sleep and wake-up information based on the second notification frame, and performs service data receiving and sending in the service slot in the sleep scheduling period based on updated first-link sleep and wake-up information.

The first device receives the second notification frame, and may update the first-link sleep and wake-up information based on the second notification frame, so as to ensure that the sleep and wake-up information corresponding to the link stored by the first device is consistent with that stored by the second device. Then, the first device may perform service data receiving and sending in the service slot in the wake-up state in the sleep scheduling period based on the updated link sleep and wake-up information.

The foregoing uses four possible scenarios as an example to describe a case in which the first device can flexibly adjust the sleep and wake-up information corresponding to the link based on the actual scenario. The following describes a possible implementation in which the first device adjusts the sleep and wake-up information.

In an example, in this embodiment of this application, a plurality of low power consumption ranges may be predefined, and each low power consumption range indicates a sleep and wake-up status of the first device in each slot in the sleep scheduling period. Different low power consumption ranges correspond to different sleep and wake-up information. The basic scheduling module may determine, based on the scenario information, which type of first sleep and wake-up information is to be generated, that is, determine, based on the scenario information, which low power consumption range is to be used. Certainly, the low power consumption state machine module may also determine, based on the actual scenario, how to update the sleep and wake-up information, for example, adjust a low power range corresponding to the current sleep and wake-up information to another low power range.

In some embodiments, six low power consumption ranges may be defined. The six low power consumption ranges include a first range, a second range, a third range, a fourth range, a fifth range, and a sixth range. A higher range indicates more power consumption reduction. The first device is in the wake-up state in the announcement slot in the sleep scheduling period corresponding to any range. For example:

First sleep and wake-up information corresponding to the first range may be "111111111111111111111111111111111", that is, all slots in the entire sleep scheduling period are in the wake-up state.

First sleep and wake-up information corresponding to the second range may be "1110101010101010101010101010110", that is, the first device wakes up once at an interval of one slot in the service slot.

First sleep and wake-up information corresponding to the third range may be "111001001001001001001001001001001", that is, the first device wakes up once at an interval of two slots in the service slot.

First sleep and wake-up information corresponding to the fourth range may be "1110000100001000010000100010000", that is, the first device wakes up once at an interval of four slots in the service slot.

First sleep and wake-up information corresponding to the fifth range may be "1110000001000000100000100000010", that is, the first device wakes up once at an interval of six slots in the service slot.

First sleep and wake-up information corresponding to the sixth range may be "111000000000010000000000010000000", that is, the first device wakes up once at an interval of ten slots in the service slot.

In addition, to reduce energy consumption of the device more, a special range may be defined. For example, the device wakes up in two slots at an interval of L*32 slots, where L is a positive integer greater than or equal to 1. It may also be understood that, in the special range, the device may enter a deep sleep state. When the device is in deep sleep, the device can wake up by using a dedicated means trigger device, for example, a Bluetooth trigger device.

It may be considered that the first range to the sixth range are ranges that can be selected when the first device turns on a screen or turns off a screen, and the special range is a range that can be selected when the first device turns off the screen. The new sleep and wake-up information initially transmitted by the basic scheduling module to the low power state machine module may represent a minimum range, namely, the first range. Then, the basic scheduling module may adjust a range in the first range based on the scenario information, that is, adjust a quantity of consecutive 0s corresponding to the first range. For example, the basic scheduling module determines that the scenario information from the application layer is "1100000100001000010000010000010", that is, it is required to wake up once every five slots. In this case, the sleep and wake-up information may be set to any one of the first range to the fourth range. Each range may correspond to a threshold, for example, a volume of data sent in a unit time.

When the first device flexibly adjusts the sleep and wake-up information, for example, in Scenario 1, the low power consumption timer module may set the timer to perform traffic statistics collection on the link between the first device and the second device. When the timer starts, if the traffic on the link between the first device and the second device is lower than a threshold X1 within a period of time, the low power consumption state machine module may determine to decrease the sleep and wake-up information by one range until the sleep and wake-up information decreases to the fourth range. Further, if the current sleep and wake-up information has decreased to a lowest range, but the traffic on the link between the first device and the second device is still lower than the threshold X1 within the period of time, the low power consumption state module may continue to decrease the lowest range and the range corresponding to the current sleep and wake-up information until the current sleep and wake-up information is decreased to the lowest range among optional ranges, for example, the sixth range or the special range. Certainly, when the traffic on the link between the first device and the second device increases and exceeds the threshold X1 within a period of time, the low power consumption state machine module may increase the range corresponding to the sleep and wake-up information, for example, restore the range to a range corresponding to full wake-up or service setting. If the traffic on the link between the first device and the second device continues to increase within a period of time and exceeds a threshold X2, the low power consumption state machine module may continue to increase the range currently corresponding to the sleep and wake-up information until the range is increased to a highest range.

Likewise, in Scenario 2, when determining that there is the emergency service, the first device may adjust the current sleep and wake-up information from one low power consumption range to another low power consumption range. For example, if a current low power consumption range is a sixth range, the power consumption range may be adjusted from the sixth range to a fourth range or another range. A specific range to which the current low power consumption range is adjusted may be predefined, for example, two low power consumption ranges are increased. Alternatively, a range to which the current low power consumption range is adjusted may be determined based on a listened link traffic volume, so as to improve data transmission efficiency as much as possible and reduce power consumption of the first device as much as possible.

In Scenario 3, when determining that the volume of the data stored in the data cache module is greater than the preset threshold, the first device may adjust the current sleep and wake-up information from one low power consumption range to another low power consumption range. For example, if a current low power consumption range is a sixth range, the power consumption range may be adjusted from the sixth range to a fourth range or another range. A specific range to which the current low power consumption range is adjusted may be predefined, for example, two low power consumption ranges are increased. Alternatively, a range to which the current low power consumption range is adjusted may be determined based on a specific data volume, so as to improve data transmission efficiency as much as possible and reduce power consumption of the first device as much as possible.

In Scenario 4, the first device determines that the service changes, and may adjust the current sleep and wake-up information from one low power consumption range to another low power consumption range. For example, the first device currently performs the first service, and the current low power consumption range is a fourth range. If the second service arrives, the fourth range may be adjusted to a third range or another range. A specific range to which the current low power consumption range is adjusted may be predefined, for example, two low power consumption ranges are decreased. Alternatively, a range to which the current low power consumption range is adjusted may be determined based on a feature of the second service, so as to reduce power consumption of the first device as much as possible. For another example, the first device currently performs the first service, and the current low power consumption range is a fourth range. If the first service is deleted, the fourth range may be adjusted to a fifth range or another range. A specific range to which the current low power consumption range is adjusted may be predefined, for example, two low power consumption ranges are increased.

In this embodiment of this application, in the system formed by establishing connections between the plurality of devices, one device may be selected from the plurality of devices as the primary device, and the primary device determines to use N time slices as one sleep scheduling period. Each device may independently select a sleep and wake-up state of each time slice in the sleep scheduling period. Each device may broadcast sleep and wake-up information of the device in a preset time slice in the sleep scheduling period. After receiving a PNF from another device, each device may determine and update a stored sleep and wake-up scheduling table with reference to a sleep and wake-up status of the device. In this way, all the devices in the system can implement sleep scheduling based on the unified sleep and wake-up scheduling table. Because each device in the system does not need to rely on a fixed device in the distributed system, for example, a central node, to update the sleep and wake-up scheduling table, the sleep scheduling method provided in embodiments of this application can be applied to a many-to-many connection scenario.

Based on the foregoing embodiments, an embodiment of this application further provides an electronic device. The electronic device is, for example, a mobile phone, a PAD, a portable computer, or a smart speaker. As shown in FIG. 15, the electronic device may include a display 1501, one or more processors 1502, and one or more memories 1503, configured to store one or more programs 1504. The foregoing components may be connected through one or more communication buses 1505. The display 1501 may be configured to display content of a file in the electronic device; the display 1501 may be configured to display a desktop of the electronic device; the display 1501 may be configured to display an image; or the like.

When the one or more programs 1504 stored in the memory 1503 are executed by the one or more processors 1502, the electronic device may be configured to perform steps in the embodiment shown in FIG. 10, FIG. 13 or FIG. 14, or another corresponding embodiment.

It should be noted that, in embodiments of this application, division into the modules is an example, and is merely logical function division. During actual implementation, another division manner may be used. Function modules in embodiments of the present invention may be integrated into one processing module, or each of the modules may exist alone physically, or two or more modules may be integrated into one module. For example, in the foregoing embodiment, the basic scheduling module and the dynamic scheduling module may be a same module or different modules. The integrated module may be implemented in a form of hardware, or may be implemented in a form of a software function module, or may be implemented in a form of a combination of hardware and a software function module.

In embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may represent: a, b, c, a-b, a-c, b-c, or a-b-c, where a, b, and c may be singular or plural. The terms "include", "have", and their variants all mean "include but are not limited to", unless otherwise specifically emphasized in another manner.

In addition, unless otherwise stated, ordinal numbers such as "first" and "second" in embodiments of this application are used to distinguish between a plurality of objects, and are not intended to limit sizes, content, an order, a time sequence, priorities, importance degrees, or the like of the plurality of objects. For example, a second file and a second file are merely used to distinguish between different files, but do not indicate different sizes, content, priorities, importance, or the like of the two files.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, applied to a distributed system comprising a first device, a second device, and a third device, and comprising:

determining, by the first device based on first scenario information, that a first service arrives, wherein the first scenario information indicates a service feature of the first service;

generating, by the first device, second sleep and wake-up information based on the first scenario information and first sleep and wake-up information, wherein:

the first sleep and wake-up information indicates a current sleep and wake-up status of the first device in each time slice in a sleep scheduling period, and the second sleep and wake-up information indicates a sleep and wake-up status to be met in each time slice in the sleep scheduling period when the first device performs a service comprising the first service; and updating, by the first device, the second sleep and wake-up information to a sleep and wake-up scheduling table, wherein:

the sleep and wake-up scheduling table comprises a sleep and wake-up status of each device in the distributed system, and the sleep and wake-up scheduling table is used by the first device to perform data receiving and sending with another device in the distributed system.

2. The method according to claim 1, further comprising:

broadcasting, by the first device, a first periodical notify frame (PNF) in a preset time slice in the sleep scheduling period, wherein the first PNF indicates the second sleep and wake-up information;

receiving, by the first device, a second PNF from the second device, wherein the second PNF indicates sleep and wake-up information of the second device; and updating, by the first device, the stored sleep and wake-up scheduling table based on the second PNF.

3. The method according to claim 2, further comprising:

determining, by the first device, to enter any one of a plurality of scenarios;

updating, by the first device, sleep and wake-up information corresponding to a link; and notifying the second device of updated sleep and wake-up information corresponding to the link, wherein:

the plurality of scenarios comprises a keepalive scenario, a link change scenario, an emergency service scenario, or a service change scenario, and the keepalive scenario indicates that the link of the first device keeps in a connected state and there is no service data interaction between the first device and another device.

4. The method according to claim 3, wherein the first device enters the keepalive scenario, and the method further comprises:

querying, by the first device, a cached data volume;

when the data volume is greater than or equal to a first preset threshold, updating, by the first device, sleep and wake-up information corresponding to a transmission link between the first device and the second device to first-link sleep and wake-up information;

sending, by the first device, a first notification frame to the second device, wherein the first notification frame carries the first-link sleep and wake-up information, so that the second device updates, based on the first-link sleep and wake-up information, stored sleep and wake-up information corresponding to the transmission link between the first device and the second device to second-link sleep and wake-up information; and receiving, by the first device, a second notification frame from the second device, wherein the second notification frame carries the second-link sleep and wake-up information.

5. The method according to claim 3, wherein the first device enters the link change scenario, and the method further comprises:

determining, by the first device, that traffic on a transmission link between the first device and the second device is greater than or equal to a second preset threshold;

updating, by the first device, sleep and wake-up information corresponding to the transmission link between the first device and the second device to first-link sleep and wake-up information;

sending, by the first device, a first notification frame to the second device, wherein the first notification frame carries the first-link sleep and wake-up information, so that the second device updates, based on the first-link sleep and wake-up information, stored sleep and wake-up information corresponding to the transmission link between the first device and the second device to second-link sleep and wake-up information; and receiving, by the first device, a second notification frame from the second device, wherein the second notification frame carries the second-link sleep and wake-up information.

6. The method according to claim 3, wherein the first device enters the emergency service scenario, and the method further comprises:

updating, by the first device, sleep and wake-up information corresponding to a transmission link between the first device and the second device to first-link sleep and wake-up information;

sending, by the first device, a first notification frame to the second device, wherein the first notification frame carries the first-link sleep and wake-up information, so that the second device updates, based on the first-link sleep and wake-up information, stored sleep and wake-up information corresponding to the transmission link between the first device and the second device to second-link sleep and wake-up information; and receiving, by the first device, a second notification frame from the second device, wherein the second notification frame carries the second-link sleep and wake-up information.

7. The method according to claim 1, wherein generating, by the first device, the second sleep and wake-up information based on the first scenario information and the first sleep and wake-up information comprises:

generating, by the first device, the second sleep and wake-up information according to a first preset rule, the first scenario information, and the first sleep and wake-up information, wherein the first preset rule meets one or more of the following:

the first device currently has no service, the first device cannot determine sleep and wake-up information for performing the first service, and the second sleep and wake-up information indicates that the first device is in a wake-up state in each time slice in the sleep scheduling period;

the first device currently has a service, the first sleep and wake-up information indicates that the first device is in a wake-up state in each time slice in the sleep scheduling period, and the second sleep and wake-up information indicates that the first device is in a wake-up state in each time slice in the sleep scheduling period; or the first device currently has a service, the first sleep and wake-up information indicates that the first device is in a wake-up state in some time slices in the sleep scheduling period, and when the first device cannot determine sleep and wake-up information for performing the first service, the second sleep and wake-up information indicates that the first device is in a wake-up state in each time slice in the sleep scheduling period; or when the first device can determine sleep and wake-up information for performing the first service, the second sleep and wake-up information is generated based on the first sleep and wake-up information and the sleep and wake-up information for performing the first service by the first device.

8. The method according to claim 1, wherein the first scenario information comprises one or more of the following information:

type information of the first service, a minimum delay tolerance value of the first service, a packet transmission interval corresponding to the first service, and a scenario level corresponding to the first service, wherein the scenario level indicates a sleep and wake-up status of the first service in each time slice in the sleep scheduling period, and different scenario levels correspond to different sleep and wake-up statuses.

9. An electronic device, wherein:

the electronic device is any one of a plurality of electronic devices in a distributed system, the distributed system further comprises a second electronic device and a third electronic device, the electronic device comprises a memory and at least one processor coupled to the memory, the memory is configured to store instructions, the at least one processor is configured to execute the instructions, and when the at least one processor executes the instructions, the electronic device is enabled to perform the following operations:

determining, based on first scenario information, that a first service arrives, wherein the first scenario information indicates a service feature of the first service;

generating second sleep and wake-up information based on the first scenario information and first sleep and wake-up information, wherein:

the first sleep and wake-up information indicates a current sleep and wake-up status of the electronic device in each time slice in a sleep scheduling period, and the second sleep and wake-up information indicates a sleep and wake-up status to be met in each time slice in the sleep scheduling period when the electronic device performs a service comprising the first service; and updating the second sleep and wake-up information to a sleep and wake-up scheduling table, wherein:

the sleep and wake-up scheduling table comprises a sleep and wake-up status of each device in the distributed system, and the sleep and wake-up scheduling table is used by the electronic device to perform data receiving and sending with another device in the distributed system.

10. The electronic device according to claim 9, wherein: the electronic device further comprises a transceiver configured to:

broadcast a first periodical notify frame (PNF) in a preset time slice in the sleep scheduling period; and receive a second PNF from the second electronic device, wherein:

the first PNF indicates the second sleep and wake-up information, and the second PNF indicates sleep and wake-up information of the second electronic device; and the at least one processor is further configured to update the stored sleep and wake-up scheduling table based on the second PNF.

11. The electronic device according to claim 10, wherein the at least one processor is further configured to:

determine to enter any one of a plurality of scenarios;

update sleep and wake-up information corresponding to a link; and notify the second electronic device of updated sleep and wake-up information corresponding to the link, wherein:

the plurality of scenarios comprises a keepalive scenario, a link change scenario, an emergency service scenario, or a service change scenario, and the keepalive scenario indicates that the link of the electronic device keeps in a connected state and there is no service data interaction between the electronic device and another device.

12. The electronic device according to claim 11, wherein: the electronic device enters the keepalive scenario, the at least one processor is further configured to:

query a cached data volume; and when the data volume is greater than or equal to a first preset threshold, update sleep and wake-up information corresponding to a transmission link between the electronic device and the second electronic device to first-link sleep and wake-up information; and the transceiver is further configured to:

send a first notification frame to the second electronic device, wherein the first notification frame carries the first-link sleep and wake-up information, so that the second electronic device updates, based on the first-link sleep and wake-up information, stored sleep and wake-up information corresponding to the transmission link between the electronic device and the second electronic device to second-link sleep and wake-up information; and receive a second notification frame from the second electronic device, wherein the second notification frame carries the second-link sleep and wake-up information.

13. The electronic device according to claim 11, wherein: the electronic device enters the link change scenario, the at least one processor is further configured to:

determine that traffic on a transmission link between the electronic device and the second electronic device is greater than or equal to a second preset threshold, and update sleep and wake-up information corresponding to the transmission link between the electronic device and the second electronic device to first-link sleep and wake-up information; and the transceiver is further configured to:

send a first notification frame to the second electronic device, wherein the first notification frame carries the first-link sleep and wake-up information, so that the second electronic device updates, based on the first-link sleep and wake-up information, stored sleep and wake-up information corresponding to the transmission link between the electronic device and the second electronic device to second-link sleep and wake-up information; and receive a second notification frame from the second electronic device, wherein the second notification frame carries the second-link sleep and wake-up information.

14. The electronic device according to claim 11, wherein: the electronic device enters the emergency service scenario, the at least one processor is further configured to update sleep and wake-up information corresponding to a transmission link between the electronic device and the second electronic device to first-link sleep and wake-up information; and the transceiver is further configured to:

send a first notification frame to the second electronic device, wherein the first notification frame carries the first-link sleep and wake-up information, so that the second electronic device updates, based on the first-link sleep and wake-up information, stored sleep and wake-up information corresponding to the transmission link between the electronic device and the second electronic device to second-link sleep and wake-up information; and receive a second notification frame from the second electronic device, wherein the second notification frame carries the second-link sleep and wake-up information.

15. The electronic device according to claim 9, wherein the at least one processor is further configured to:

generate the second sleep and wake-up information according to a first preset rule, the first scenario information, and the first sleep and wake-up information, wherein the first preset rule meets one or more of the following:

the electronic device currently has no service, the electronic device cannot determine sleep and wake-up information for performing the first service, and the second sleep and wake-up information indicates that the electronic device is in a wake-up state in each time slice in the sleep scheduling period;

the electronic device currently has a service, the first sleep and wake-up information indicates that the electronic device is in a wake-up state in each time slice in the sleep scheduling period, and the second sleep and wake-up information indicates that the electronic device is in a wake-up state in each time slice in the sleep scheduling period; or the electronic device currently has a service, the first sleep and wake-up information indicates that the electronic device is in a wake-up state in some time slices in the sleep scheduling period, and if the electronic device cannot determine sleep and wake-up information for performing the first service, the second sleep and wake-up information indicates that the electronic device is in a wake-up state in each time slice in the sleep scheduling period; or if the electronic device can determine sleep and wake-up information for performing the first service, the second sleep and wake-up information is generated based on the first sleep and wake-up information and the sleep and wake-up information for performing the first service by the electronic device.

16. The electronic device according to claim 9, wherein the first scenario information comprises one or more of the following information:

type information of the first service, a minimum delay tolerance value of the first service, a packet transmission interval corresponding to the first service, and a scenario level corresponding to the first service, wherein the scenario level indicates a sleep and wake-up status of the first service in each time slice in the sleep scheduling period, and different scenario levels correspond to different sleep and wake-up statuses.

17. A non-transitory computer-readable storage medium storing computer-executable instructions, wherein:

the non-transitory computer-readable storage medium corresponds to an electronic device of a distributed system that further comprises a second electronic device and a third electronic device, and when the computer-executable instructions are invoked by the electronic device, the electronic device is enabled to perform the following operations:

determining, based on first scenario information, that a first service arrives, wherein the first scenario information indicates a service feature of the first service;

generating second sleep and wake-up information based on the first scenario information and first sleep and wake-up information, wherein:

the first sleep and wake-up information indicates a current sleep and wake-up status of the electronic device in each time slice in a sleep scheduling period, and the second sleep and wake-up information indicates a sleep and wake-up status to be met in each time slice in the sleep scheduling period when the electronic device performs a service comprising the first service; and updating the second sleep and wake-up information to a sleep and wake-up scheduling table, wherein:

the sleep and wake-up scheduling table comprises a sleep and wake-up status of each device in the distributed system, and the sleep and wake-up scheduling table is used by the electronic device to perform data receiving and sending with another device in the distributed system.

18. The non-transitory computer-readable storage medium according to claim 17, wherein when the computer-executable instructions are invoked by the electronic device, the electronic device is further enabled to perform the following operations:

broadcasting a first periodical notify frame (PNF) in a preset time slice in the sleep scheduling period, wherein the first PNF indicates the second sleep and wake-up information;

receiving a second PNF from the second electronic device, wherein the second PNF indicates sleep and wake-up information of the second electronic device; and updating the stored sleep and wake-up scheduling table based on the second PNF.

19. The non-transitory computer-readable storage medium according to claim 18, wherein when the computer-executable instructions are invoked by the electronic device, the electronic device is further enabled to perform the following operations:

determining to enter any one of a plurality of scenarios;

updating sleep and wake-up information corresponding to a link; and notifying the second electronic device of updated sleep and wake-up information corresponding to the link, wherein the plurality of scenarios comprise a keepalive scenario, a link change scenario, an emergency service scenario, or a service change scenario, and the keepalive scenario indicates that the link of the electronic device keeps in a connected state and there is no service data interaction between the electronic device and another device.

20. The non-transitory computer-readable storage medium according to claim 19, wherein:

the electronic device enters the keepalive scenario, and when the computer-executable instructions are invoked by the electronic device, the electronic device is further enabled to perform the following operations:

querying a cached data volume;

when the data volume is greater than or equal to a first preset threshold, updating sleep and wake-up information corresponding to a transmission link between the electronic device and the second electronic device to first-link sleep and wake-up information;

sending a first notification frame to the second electronic device, wherein the first notification frame carries the first-link sleep and wake-up information, so that the second electronic device updates, based on the first-link sleep and wake-up information, stored sleep and wake-up information corresponding to the transmission link between the electronic device and the second electronic device to second-link sleep and wake-up information; and receiving a second notification frame from the second electronic device, wherein the second notification frame carries the second-link sleep and wake-up information.

* * * * *